US006742002B2

(12) United States Patent
Arrowood

(10) Patent No.: US 6,742,002 B2
(45) Date of Patent: May 25, 2004

(54) COMPUTER-IMPLEMENTED AND/OR COMPUTER-ASSISTED WEB DATABASE AND/OR INTERACTION SYSTEM FOR STAFFING OF PERSONNEL IN VARIOUS EMPLOYMENT RELATED FIELDS

(75) Inventor: Bryce A. Arrowood, Bethesda, MD (US)

(73) Assignee: MPS IP Services Corp., Jacksonville, FL (US)

(*) Notice: Subject to any disclaimer, the term of this patent is extended or adjusted under 35 U.S.C. 154(b) by 147 days.

(21) Appl. No.: 09/812,941

(22) Filed: Mar. 27, 2001

(65) Prior Publication Data

US 2002/0010614 A1 Jan. 24, 2002

Related U.S. Application Data

(60) Provisional application No. 60/246,078, filed on Nov. 7, 2000, provisional application No. 60/206,546, filed on May 24, 2000, and provisional application No. 60/192,309, filed on Mar. 27, 2000.

(51) Int. Cl.$^7$ .............................................. G06F 17/30
(52) U.S. Cl. ...................................... 707/104.1; 705/11
(58) Field of Search .......................... 707/104.1; 705/11

(56) References Cited

U.S. PATENT DOCUMENTS

| | | | |
|---|---|---|---|
| 5,117,353 A | | 5/1992 | Stipanovich et al. |
| 5,164,897 A | * | 11/1992 | Clark et al. ..................... 705/1 |
| 5,189,608 A | | 2/1993 | Lyons et al. |
| 5,329,447 A | | 7/1994 | Leedom, Jr. |
| 5,722,418 A | * | 3/1998 | Bro ............................. 600/545 |
| 5,924,072 A | * | 7/1999 | Havens ........................... 705/1 |
| 5,991,742 A | | 11/1999 | Tran |
| 6,049,776 A | | 4/2000 | Donnelly et al. |
| 6,073,108 A | | 6/2000 | Peterson |
| 6,381,592 B1 | * | 4/2002 | Reuning ......................... 707/3 |
| 6,401,079 B1 | * | 6/2002 | Kahn et al. .................... 705/30 |
| 2001/0042000 A1 | * | 11/2001 | Defoor ........................... 705/9 |
| 2001/0047282 A1 | * | 11/2001 | Raveis ........................... 705/7 |
| 2002/0184210 A1 | * | 12/2002 | Khan ............................. 707/6 |

OTHER PUBLICATIONS

Copy of PCT Search Report.
International Preliminary Examination Report from PCT/US01/09694.

* cited by examiner

Primary Examiner—Wayne Amsbury
(74) Attorney, Agent, or Firm—Irah H. Donner; Hale and Dorr LLP

(57) ABSTRACT

A method, system and process for a computer-assisted staffing of employees for a client. The system collects and stores, in a relational database, a large amount of information relating to the staffing of client's projects, including employee data, firm data, and order data. For example, the system stores timesheets for the employees corresponding to the clients to which they are assigned; feedback on the employees' performances is obtained and stored; and a large amount of other information. The information can be used by clients to manage and analyze personnel functions, to manage and analyze financial functions, to select from a roster of candidate employees, and to make future projections. Additionally, the information can be used by employees to track their performance, and personnel functions such as accrued vacation. The system actively seeks information to ensure accuracy of the stored data. The database is web-enabled and is accessible via the internet.

56 Claims, 47 Drawing Sheets

What would you like to do?

View CaseManager™ — 1501

View ClientMonitor™ — 1503

Enter SCORE™ Report — 1505

Place CorrectMatch™ Order — 1507

View Assigned Candidate Profile™ — 1509

Find Out More (To exit, simply close this window or exit your browser.)

ClientMonitor™

Williams & Connolly

LawCorps Staffing and Performance for Quarter I, 2000

| Name | Type of Work | Dates | Total Hours | Score |
|---|---|---|---|---|
| Amato, James | 102 Coding | 1/24/00-2/27/00 | 160.75 | * |
| Atrushi, Ary | 102 Coding | 2/14/00-2/27/00 | 42.00 | * |
| Barolay, John | 102 Coding | 2/21/00-2/27/00 | 31.50 | * |
| Bunyan, Jason | 100 Litigation | 1/10/100-1/16/00 | 12.75 | * |
| Change, Evelynne | 102 Coding | 1/3/00-1/30/00 | 120.00 | * |
| Diakite, Mohamed | 102 Coding | 2/21/00-2/27/00 | 31.50 | * |
| Ekekewe, Olekanma | 102 Coding | 1/3/00-2/27/00 | 318.50 | * |
| Essien-Udom, Nkeruwem | 100 Litigation | 1/3/00-1/9/00 | 0.00 | 86 |
| Frkovich, Julie | 900 Miscellaneous | 1/3/00-2/27/00 | 320.00 | 80 |
| Hams, Archie | 100 Litigation | 1/3/00-1/9/00 | 4.00 | * |
| Humphrey, Marcus | 102 Coding | 1/3/00-1/9/00 | 32.00 | 90 |
| Humphrey, Marcus | 102 Coding | 1/17/00-2/27/00 | 157.00 | * |
| Jean-Baptiste, Joel | 102 Coding | 2/14/00-2/27/00 | 47.50 | * |
| Kano, Masako | 102 Coding | 1/3/00-2/20/00 | 246.00 | |
| Kmghten, Mishawn | 102 Coding | 1/10/00-1/30/00 | 100.00 | |
| Melvin, Robert | 102 Coding | 2/14/00-2/27/00 | 74.50 | |
| O'Byrne, Bryan | 102 Coding | 1/24/00-2/220/00 | 140.00 | |
| Scott, Kenasha | 102 Coding | 2/14/00-2/2700 | 48.50 | |
| Smith, David | 102 Coding | 2/14/00-2/27/00 | 50.75 | |
| Yancy, Gregory | 102 Coding | 1/3/00-1/16/00 | 92.00 | |

*No Score evaluation available for this event.

Produced for Williams & Connolly on 4/14/00 at 10:20:34.

This data is the proprietary and confidential property of LawCorps® and Williams & Connolly. Unauthorized use is strictly prohibited.

FIG. 17

LAWCORPS® | WEB DATA SYSTEM

CaseManager™

Williams & Connolly

Quarter 1, 2000 LawCorps Services

Quarter Summary

| | Combined Totals | | | Weekly Average | |
|---|---|---|---|---|---|
| | Hours | Rate | Cost | Hours | Cost |
| Regular | 1,972.75 | $26.04 | $51,370.75 | 30.35 | $790.31 |
| Overtime | 56.00 | $38.91 | $2,179.00 | 0.86 | $33.52 |
| All | 2,028.75 | | $53,549.75 | Temps | 5.00 |
| LawCorps Temporary Percentage Quarter I | | | | | 88.88% |

FIG. 18A

Quarter Detail by Client Reference and Order Number

| Order # | Reference # | Regular | OT | Reg. Cost | OT Cost | Total Cost | % Cost |
|---|---|---|---|---|---|---|---|
| 21244 | | 32.00 | 0.00 | $768.00 | $0.00 | $768.00 | 1.43% |
| 21335 | | 301.00 | 19.00 | $7,826.00 | $741.00 | $8,567.00 | 15.99% |
| 21358 | | 71.50 | 20.00 | $1,787.50 | $775.00 | $2,562.50 | 1.78% |
| 21385 | | 301.50 | 17.00 | $7,839.00 | $663.00 | $8,502.00 | 15.87% |
| 21397 | | 246.00 | 0.00 | $6,396.00 | $0.00 | $6,396.00 | 11.94% |
| 21406 | | 120.00 | 0.00 | $3,120.00 | $0.00 | $3,120.00 | 5.82% |
| 21421 | | 4.00 | 0.00 | $104.00 | $0.00 | $104.00 | 0.19% |
| 21432 | | 12.75 | 0.00 | $331.50 | $0.00 | $331.50 | 0.61% |
| 21433 | | 100.00 | 0.00 | $2,600.00 | $0.00 | $2,600.00 | 4.85% |
| 21435 | | 157.00 | 0.00 | $4,082.00 | $0.00 | $4,082.00 | 7.62% |
| 21447 | | 140.00 | 0.00 | $3,640.00 | $0.00 | $3,640.00 | 6.79% |
| 21450 | | 160.75 | 0.00 | $4,179.50 | $0.00 | $4,179.50 | 7.80% |
| 21465 | | 172.75 | 0.00 | $4,664.25 | $0.00 | $4,664.25 | 8.71% |
| 21473 | | 48.50 | 0.00 | $1,261.00 | $0.00 | $1,261.00 | 2.35% |
| 21479 | | 42.00 | 0.00 | $1,134.00 | $0.00 | $1,134.00 | 2.11% |
| 21480 | | 63.00 | 0.00 | $1,638.00 | $0.00 | $1,638.00 | 3.05% | by Type of Work

FIG. 18B

Netscape: Data Entry: FirmQSA_web

| Overtime | 56.00 | $38.91 | $2,179.00 | | $33.52 |
| --- | --- | --- | --- | --- | --- |
| All | 2,028.75 | | $53,549.75 | Temps | 5.00 |
| | | | | | 88.88% |

LawCorps Temporary Percentage Quarter 1

Quarter Detail by Client Reference and Order Number

| Order # | Reference # | Regular | OT | Reg. Cost | OT Cost | Total Cost | % Cost |
| --- | --- | --- | --- | --- | --- | --- | --- |
| 21244 | | 32.00 | 0.00 | $768.00 | $0.00 | $768.00 | 1.43% |
| 21335 | | 301.00 | 19.00 | $7,826.00 | $741.00 | $8,567.00 | 15.99% |
| 21358 | | 71.50 | 20.00 | $1,787.50 | $775.00 | $2,562.50 | 1.78% |
| 21385 | | 301.50 | 17.00 | $7,839.00 | $663.00 | $8,502.00 | 15.87% |
| 21397 | | 246.00 | 0.00 | $6,396.00 | $0.00 | $6,396.00 | 11.94% |
| 21406 | | 120.00 | 0.00 | $3,120.00 | $0.00 | $3,120.00 | 5.82% |
| 21421 | | 4.00 | 0.00 | $104.00 | $0.00 | $104.00 | 0.19% |
| 21432 | | 12.75 | 0.00 | $331.50 | $0.00 | $331.50 | 0.61% |
| 21433 | | 100.00 | 0.00 | $2,600.00 | $0.00 | $2,600.00 | 4.85% |
| 21435 | | 157.00 | 0.00 | $4,082.00 | $0.00 | $4,082.00 | 7.62% |
| 21447 | | 140.00 | 0.00 | $3,640.00 | $0.00 | $3,640.00 | 6.79% |
| 21450 | | 160.75 | 0.00 | $4,179.50 | $0.00 | $4,179.50 | 7.80% |
| 21465 | | 172.75 | 0.00 | $4,664.25 | $0.00 | $4,664.25 | 8.71% |
| 21473 | | 48.50 | 0.00 | $1,261.00 | $0.00 | $1,261.00 | 2.35% |
| 21479 | | 42.00 | 0.00 | $1,134.00 | $0.00 | $1,134.00 | 2.11% |
| 21480 | | 63.00 | 0.00 | $1,638.00 | $0.00 | $1,638.00 | 3.05% |

FIG. 19-A by Type of Work

| Type of Work | Regular | OT | Reg. Cost | OT Cost | Total Cost | % Cost |
|---|---|---|---|---|---|---|
| 100 Litigation | 16.75 | 0.00 | $435.50 | $0.00 | $435.50 | 0.81% |
| 102 Coding | 1,655.00 | 37.00 | $43,109.25 | $1,438.00 | $44,547.25 | 83.18% |
| 900 Miscellaneous | 301.00 | 19.00 | $7,826.00 | $741.00 | $8,567.00 | 15.99% | by Contact

| Contact Name | Regular | OT | Reg. Cost | OT Cost | Total Cost | % Cost |
|---|---|---|---|---|---|---|
| Scott, Jennifer H. | 1,968.75 | 56.00 | $51,266.75 | $2,179.00 | $53,445.75 | 99.80% |
| Eagan, Linda | 4.00 | 0.00 | $104.00 | $0.00 | $104.00 | 0.19% |

Produced for Williams & Connolly on 4/14/00 at 10:19:25.
This data is the proprietary and confidential property of LawCorps® and Williams & Connolly.
Unauthorized use is strictly prohibited.

FIG. 19B

LAWCORPS® WEB DATA SYSTEM

Online CorrectMatch™ Order Placement

[Cancel]  [Submit Order]

Please Read:
For security reasons, your connection will be timed out after 10 minutes, even if you are still making changes. In this case, your order could be lost. Soon you will be able to save a draft order to prevent this from happening. After submitting an order, please allow a few moments to process it. Please do not click any other buttons while waiting.

Firm: Hale and Dorr, L.L.P.

Select your name: [Quarles, James L. ▼]

(If your name does not appear on this list, please contact LawCorps so that we can add you to our database and authorize internet access.)

Start: [00/00/00]
End: [00/00/00]

How many temporaries required? [0]

Is Overtime Likely? ☐ Yes

Your Internal Billing or Case Reference Number
Experienced Required and Other Requirements Report To (Person, room, floor, etc..)

Please Select a Primary Work Type

100 Litigation

Indicate the most important work type, even if there is more than one. This information will help to identify projects in your web reports. Please make sure you also indicate the work type below.

| Areas of Expertise: Check any that apply | | |
|---|---|---|
| ☐ Litigation | ☐ Bates Labeling | ☐ Coding |
| ☐ Indexing | ☐ Chronologizing | ☐ Witness File Preparation |
| ☐ Deposition Digesting | ☐ Conducting Depositions | ☐ Exhibit Preparation |
| ☐ Document Management | ☐ Privilege Log | ☐ Court Filings |
| ☐ Draft Interrogatories | ☐ Answer Interrogatories | ☐ Local & State Court Appearances |
| ☐ Federal Court Appearances | ☐ Answer Calendar Call | ☐ Tickler System |

Litigation

FIG. 21C

| Category | | | |
|---|---|---|---|
| Antitrust | ☐ Docket Calendar | ☐ Requests for Admissions | ☐ Assist at Trial |
| | ☐ Document Production | ☐ Discovery | ☐ Filing/Service of Process |
| | ☐ Prepare/File Subpoenae | ☐ Subpoena Duces Tecum | |
| | ☐ Antitrust | ☐ Document Review | ☐ Privilege Review |
| | ☐ Second Requests/CIDs | ☐ Document Pulls | ☐ Client Interviews |
| | ☐ Hart-Scott-Rodino Filings | ☐ Unfair Competition | |
| Intellectual Property | ☐ Intellectual Property | ☐ Patent Prosecution | ☐ Patent Litigation |
| | ☐ Copyright Filings | ☐ Copyright Litigation | ☐ Trademark Filings |
| | ☐ Trademark Litigation | ☐ Other I.P. Law | |
| High Tech | ☐ High Tech | ☐ Communications Contracts | ☐ Software Licensing |
| | ☐ E-Commerce | ☐ Computers/Internet Law | ☐ Telecommunications |
| | ☐ Biotechnology | | |
| Labor/Employment | ☐ Labor/Employment | ☐ Management Representation | ☐ Union Representation |
| | ☐ Employee Representation | ☐ ERISA | ☐ Benefits |
| | ☐ Workers Comp | ☐ Arbitrations/Mediations | ☐ NLRB |
| | ☐ Employment Contracts | | |
| Finance | ☐ Finance | ☐ Commercial Finance | ☐ Mutual Funds/1940 Act |
| | ☐ Project Finance | ☐ Securitization | ☐ Structured Finance |
| | ☐ Asset Backed Loans | ☐ Accounting | |
| Corporate/Commercial/Business | ☐ Corporate/Commercial/Business | ☐ Franchising | ☐ Mergers & Acquisitions |
| | ☐ Blue Sky | ☐ SEC filings | ☐ Joint Ventures |

FIG. 21D

| Computer Proficiency | | | |
|---|---|---|---|
| | ☐ Due Diligence | ☐ Preparation of Minutes | ☐ Draft Incorporation Docs |
| | ☐ Stock Certificates | ☐ Drafting Agreements | ☐ Start-Up Co. Financing |
| | ☐ IPOs | ☐ Securities | ☐ Transactional |
| | ☐ Banking/S&L/CredUn | ☐ Loans | ☐ UCC Filings |
| | ☐ Unfair-Trade Practices | ☐ Non-Profit Organizations | ☐ Commercial Contracts |
| | ☐ Contracts Negotiation | | |
| Computer Proficiency | ☐ Computer Proficiency | ☐ IBM/PC | ☐ Macintosh |
| | ☐ Unix | ☐ DOS | ☐ Windows |
| | ☐ Linux | ☐ MS Word | ☐ Corel WordPerfect |
| | ☐ Access | ☐ Legislate | ☐ AmiPro |
| | ☐ Concordance | ☐ Excel | ☐ Juris |
| | ☐ Litigators Notebook | ☐ Lotus 123 | ☐ Lotus Notes |
| | ☐ Paradox | ☐ Powerpoint | ☐ Summation |
| | ☐ Internet Research | ☐ HTML/Web Development | ☐ Other Word Processing |
| | ☐ Other Databases | ☐ Other Spreadsheets | ☐ Other Presentation |
| Legal Research & Writing | ☐ Legal Research & Writing | ☐ Cite Checking | ☐ Shepardizing |
| | ☐ Blue Booking | ☐ Lexis Nexis | ☐ Westlaw |
| | ☐ Draft Motions | ☐ Draft Briefs | ☐ Draft Memoranda |
| | ☐ Draft Pleadings | ☐ Library Skills | ☐ Obtaining Court Documents |
| | ☐ SEC Library | ☐ Factual Memos | ☐ Research at Gov't Agencies |
| | ☐ Research Case Law | ☐ Research Statutes/F&S | ☐ Research Regulations/CFR |

| | | |
|---|---|---|
| Trust & Estates | ☐ Proofreading/Editing | ☐ Blacklining | ☐ Redlining |
| | ☐ Trusts & Estates | ☐ Tax Forms | ☐ Stock Transfers |
| | ☐ Prepare Probate Documents | ☐ Estate Administration | ☐ Prepare Wills |
| Real Estate | ☐ Real Estate | ☐ Commercial | ☐ Residential |
| | ☐ Closings | ☐ Title & Surveys | ☐ Lease Abstractions |
| | ☐ Drafting/Reviewing Leases | ☐ Construction Contracts | |

[Submit Order]

[Cancel] After submitting an order, please allow a few moments to process it. Please do not click any other buttons while waiting.

FIG. 21E

| LAWCORPS® | WEB DATA SYSTEM |
|---|---|

Assigned Candidate Profile™
Click the icon in the first column to view a profile.

[Done]

| | Name | Access Expires |
|---|---|---|
| ▷ | 28890 | 06/30/2001 |
| ▷ | Abdallah | 06/30/2001 |
| ▷ | Aledra | 06/30/2001 |
| ▷ | Deborah Adams | 06/30/2001 |
| ▷ | Dena R Bauman | 06/30/2001 |
| ▷ | Diana Barry | 06/30/2001 |
| ▷ | Erek L. Barron | 06/30/2001 |
| ▷ | G. Pierce Bates | 06/30/2001 |
| ▷ | John E. Barclay | 06/30/2001 |
| ▷ | Jon A. Atkins, Esq | 06/30/2001 |

FIG. 22A

| | | |
|---|---|---|
| ⏵ | Joshua Badach | 06/30/2001 |
| ⏵ | Joashua Badach | 06/10/2001 |
| ⏵ | McDave E. Appiah | 06/30/2001 |
| ⏵ | Nathan J. Bayer | 06/30/2001 |
| ⏵ | Nora E. Bauland | 06/30/2001 |

[Done]

FIG. 22B

| LAWCORPS® | WEB DATA SYSTEM |
|---|---|

Assigned Candidate Profile™ for Cleary, Gottlieb, Steen & Hamilton

For more information about this candidate contact LawCorps at (202) 785-5996 Ext 103 or via email at larrowood@lawcorps.com.

[ Previous Candidate ]   [ Next Candidate ]   [ Return to List ]

| Joshua Badach |
|---|

(Access to this profile will expire after Saturday, June 30, 2001.)

| LawCorps Profile |
|---|
| Joshua Badach earned a B.A. (1998), with honors, from Rutgers University and a J.D. (1995) from the University of Miami. Before completing a long-term antitrust assignment at Heller, Ehrman through LawCorps, Josh worked as a contract attorney in the antitrust area at Anrold & Porter on a large biotech merger. Since April 2000, when his assignment at Heller ended, he has worked on a second request and merger document production at two other top firms in DC. He is truly a wonderful candidate - incredibly hard-working, detail-oriented, flexible and pleasant. Josh's references and supervisors praise his work product and great attitude and we highly recommend him! He is a member of the Maryland bar. |

| Interview | | |
|---|---|---|
| Impression Score | 98 | View Details |
| Highly motivated and professional attorney with long term interests in international law. GREAT refs. Very friendly. Would be great in a team. | | |

| Test | Score |
|---|---|
| Litigation | 100 |

| References Summary | | |
|---|---|---|
| Overall Score | 92 | View Details |

FIG. 23A

Joshua was a great employee. Diligent, outgoing and a pleasure to work with. Highly recommend.

Great guy. Highly intelligent. He clearly should only work for LawCorps. Top notch -- LawCorps material only. Keep away from Legal Source.

| Education | | | |
|---|---|---|---|
| School | Degree | GPA | Graduation Date |
| U of Miami | JD | 3.30 | May 1995 |
| Rutgers | BA | 3.60 | May 1998 |

| Languages | | | |
|---|---|---|---|
| Language | Speaks | Reads | Writes |
| French | Fluent | Fluent | Fluent |
| Italian | Good | Good | Good |
| Polish | Fluent | Fluent | Fluent |
| Russian | Fluent | Fluent | Fluent |

| Bars Admitted To Practice |
|---|
| State |
| MD |

| Experience | | | |
|---|---|---|---|
| Legal Research & Writing Category Only | | View all Experience Categories | |
| ID | Description | Months | Last Done |
| 300 | Legal Research & Writing | | |
| 301 | Cite Checking | 6 | |
| 302 | Shepardizing | 6 | |
| 303 | Blue Booking | 6 | |
| 304 | Lexis-Nexis | 24 | |
| 305 | Westlaw | 24 | |
| 306 | Draft Motions | 3 | |
| 307 | Draft Briefs | 3 | |
| 310 | Library skills | 24 | |
| 311 | Obtaining Court Documents | 6 | |
| 313 | Factual Memos | 24 | |
| 314 | Research at Gov't Agencies | 6 | |
| 317 | Proofreading/Editing | | |
| 318 | Blacklining | 3 | |

FIG. 23B

| 319 | Redlining | | 3 | |

| SCORE™ Summary | | |
|---|---|---|
| Overall Score | 92 | View Details |
| Josh is one of the best temps we have ever had. Wow. This guy deserves a double bonus. In fact, I am willing to take out my own wallet to pay this guy. How do you do it at LawCorps? Where do you find your people. Another amazing LawCorps employee!!<br><br>Unbelievable employee. I don't know why LC doesn't own the temp market. Every employee you send is just like Josh. Give him 10 bonuses this month. We want to keep him with our firm forever. Thanks for the great candidate. | | |

| VideoView™ | Resume |
|---|---|
| Under Construction | Under Construction |

[Previous Candidate]  [Next Candidate]  [Return to List]

FIG. 23C

  LawCorps** Web Database System

Assigned Candidate Profile™ for Cleary, Gottlieb, Steen & Hamilton

For more information about this candidate contact LawCorps at (202) 785-5996 Ext 103 or via email at larrowood@lawcorps.com.

[ Close This Window ]

| Joshua Badach |

(Access to this profile will expire after Saturday, June 30, 2001.)

| Interview | |
|---|---|
| Impression Score* | 98 |
| Category | Rating |
| Presentation | Very Good |
| Bearing | Excellent |
| Expression | Excellent |
| Motivation | Excellent |
| Personality | Excellent |
| Job Knowledge* | Very Good |

Highly motivated and professional attorney with long term interests in international law.

GREAT refs. Very friendly. Would be great in a team.

| Test | Score |
|---|---|
| Litigation | 100 |

*Job Knowledge category is not included when calculating the overall score.

[ Close This Window ]

FIG. 24

☒ LawCorps** Web Database System

Assigned Candidate Profile™ for Cleary, Gottlieb, Steen & Hamilton

For more information about this candidate contact LawCorps at (202) 785-5996 Ext 103 or via email at larrowood@lawcorps.com.

Close This Window

Joshua Badach (Access to this profile will expire after Saturday, June 30, 2001.)

| References Summary ||
|---|---|
| Overall Score | 92 |

| Reference 1 ||
|---|---|
| Description | Rating |
| Punctuality | Excellent |
| Reliability | Very Good |
| Accuracy | Excellent |
| Organization | Excellent |
| Competence | Excellent |
| Efficiency | Excellent |
| Joshua was a great employee. Diligent, outgoing and a pleasure to work with. Highly recommend. ||

FIG. 25A

| Reference 2 ||
|---|---|
| Description | Rating |
| Punctuality | Excellent |
| Reliability | Satisfactory |
| Accuracy | Very Good |
| Organization | Very Good |
| Competence | Excellent |
| Efficiency | Excellent |
| Great guy. Highly intelligent. He clearly should only work for LawCorps. Top notch --LawCorps material only. Keep away from Legal Source. ||

[Close This Window]

FIG. 25B

☒ LawCorps**Web Database System

Assigned Candidate Profile™ for Cleary, Gottlieb, Steen & Hamilton

For more information about this candidate contact LawCorpss at (202) 785-5996 Ext 103 or via email at larrowood@lawcorps.com.

Close This Window

Joshua Badach (Access to this profile will expire after Saturday, June 30, 2001.)

| Experience | | | |
|---|---|---|---|
| ID | Description | Months | Last Done |
| 100 | Litigation | 6 | |
| 101 | Bates Labeling | 6 | |
| 102 | Coding | 6 | |
| 103 | Indexing | 4 | |
| 104 | Chronologizing | 4 | |
| 108 | Exhibit Preparation | 6 | |
| 111 | Court Filings | 3 | |
| 120 | Assist at Trial | 5 | |
| 121 | Document Production | 6 | |
| 150 | Antitrust | 6 | |
| 160 | Intellectual Property | 6 | |
| 200 | Corporate/Commercial/Business | | |
| 202 | Mergers & Acquisitions | 3 | |
| 204 | SEC filings | 3 | |
| 205 | Joint Ventures | 24 | |
| 216 | Loans | 6 | |
| 245 | Windows | 3 | |
| 247 | MS Word | 3 | |
| 248 | Corel WordPerfect | 3 | |
| 253 | Excel | 2 | |
| 256 | Lotus123 | 2 | |
| 257 | Lotus Notes | 2 | |

FIG. 26A

| | | |
|---|---|---|
| 259 | PowerPoint | 2 |
| 261 | Internet Research | 3 |
| 300 | Legal Research & Writing | |
| 301 | Cite Checking | 6 |
| 302 | Shepardizing | 6 |
| 303 | Blue Booking | 6 |
| 304 | Lexis-Nexis | 24 |
| 305 | Westlaw | 24 |
| 306 | Draft Motions | 3 |
| 307 | Draft Briefs | 3 |
| 310 | Library Skills | 24 |
| 311 | Obtaining Court Documents | 6 |
| 313 | Factual Memos | 24 |
| 314 | Research at Gov't Agencies | 6 |
| 317 | Proofreading/Editing | |
| 318 | Blacklining | 3 |
| 319 | Redlining | 3 |
| 500 | Trusts & Estates | |
| 501 | Tax Forms | 2 |
| 800 | Legislative | |
| 801 | Attending Hearings | 1 |
| 802 | Analyzing Documents | 36 |
| 804 | Retrieval of Fed & State B | 6 |
| 805 | Research Bills/Regulations | 6 |
| 904 | Int'l Trade/CVD/Antidumping | 24 |

[Close This Window]

FIG. 26B

☒ LawCorps** Web Database System

Assigned Candidate Profile™ for Cleary, Gottlieb, Steen & Hamilton

For more information about this candidate contact LawCorps at (202) 785-5996 Ext 103 or via email at larrowood@lawcorps.com.

Close This Window

Joshua Badach (Access to this profile will expire after Saturday, June 30, 2001.)

| SCORE™ | |
|---|---|
| Overall Score | 92 |

| June 2000 | |
|---|---|
| Description | Rating |
| Attitude | Exceeded Expectations |
| Competence | Exceeded Expectations |
| Job Skills | Exceeded Expectations |
| Organization | Exceeded Expectations |
| Productivity | Exceeded Expectations |
| Professionalism | Exceeded Expectations |
| Punctuality | Exceeded Expectations |
| Reliability | Exceeded Expectations |
| Overall | Exceeded Expectations |
| LawCorps' Performance | Exceeded Expectations |
| Josh is one of the best temps we have ever had. Wow. This guy deserves a double bonus. In fact, I am willing to take out my own wallet to pay this guy. How do you do it at LawCorps? Where do you find your people. Another amazing LawCorps employee!! | |

FIG. 27A

| March 2000 ||
|---|---|
| Description | Rating |
| Attitude | Met Expectations |
| Competence | Exceeded Expectations |
| Job Skills | Exceeded Expectations |
| Organization | Met Expectations |
| Productivity | Met Expectations |
| Professionalism | Met Expectations |
| Punctuality | Exceeded Expectations |
| Reliability | Exceeded Expectations |
| Overall | Exceeded Expectations |
| LawCorps' Performance | Exceeded Expectations |
| Unbelievable employee. I don't know why LC doesn't own the temp market. Every employee you send is just like Josh. Give him 10 bonuses this month. We want to keep him with our firm forever. Thanks for the great candidate. ||

| October 1999 ||
|---|---|
| Description | Rating |
| Attitude | Met Expectations |
| Competence | Met Expectations |
| Job Skills | Met Expectations |
| Organization | Met Expectations |
| Productivity | Met Expectations |
| Professionalism | Met Expectations |
| Punctuality | Met Expectations |
| Reliability | Met Expectations |
| Overall | Met Expectations |
| LawCorps' Performance | Met Expectations |

| September 1999 ||
|---|---|
| Description | Rating |
| Attitude | Met Expectations |
| Competence | Met Expectations |
| Job Skills | Met Expectations |
| Organization | Met Expectations |
| Productivity | Met Expectations |
| Professionalism | Met Expectations |
| Punctuality | Met Expectations |
| Reliability | Met Expectations |
| Overall | Met Expectations |
| LawCorps' Performance | Met Expectations |

FIG. 27B

| August 1999 ||
|---|---|
| Description | Rating |
| Attitude | Exceeded Expectations |
| Competence | Exceeded Expectations |
| Job Skills | Exceeded Expectations |
| Organization | Exceeded Expectations |
| Productivity | Exceeded Expectations |
| Professionalism | Exceeded Expectations |
| Punctuality | Exceeded Expectations |
| Reliability | Exceeded Expectations |
| Overall | Exceeded Expectations |
| LawCorps' Performance | Exceeded Expectations |

| July 1999 ||
|---|---|
| Description | Rating |
| Attitude | Exceeded Expectations |
| Competence | Exceeded Expectations |
| Job Skills | Exceeded Expectations |
| Organization | Exceeded Expectations |
| Productivity | Exceeded Expectations |
| Professionalism | Exceeded Expectations |
| Punctuality | Exceeded Expectations |
| Reliability | Exceeded Expectations |
| Overall | Exceeded Expectations |
| LawCorps' Performance | Exceeded Expectations |

The Overal Score is based on feedback from firms where this employee worked. It covers the most recent 12 months for which evaluations exist. A score of 80% is the equivalent of 'Met Expectations' for all ten categories.

[ Close This Window ]

FIG. 27C

LAWCORPS® Experience Evaluation Form

| LITIGATION - 100       Months Last Done | PROOFREADING - 400     Months Last Done |
|---|---|
| 101 Bates Stamping | 401 Blacklining |
| 102 Coding | 402 Redlining |
| 103 Indexing | TRUSTS & ESTATES - 500 |
| 104 Chronologizing | 501 Tax Forms |
| 105 Witness File Preparation | 502 Stock Transfers |
| 106 Deposition Digesting | 503 Prepare Probate Documents |
| 107 Digesting w/ Dictaphone | |
| 108 Exhibit Preparation | REAL ESTATE - 600 |
| 109 Document Management | 601 Commercial |
| 110 Computerized Cases | 602 Residential |
| 111 Court Filings | 603 Closings |
| 112 Drafting Interrogatories | 604 Titles & Surveys |
| 113 Answering Interrogatories | ENVIRONMENTAL - 700 |
| 114 Document Searches | 701 Hazardous Waste |
| 115 Cataloging | 702 RCRA |
| 116 Answer Calendar Call | 703 FIFRA |
| 117 Tickler System | 704 CERIA |
| 118 Docket Calendar | LEGISLATIVE - 800 |
| 119 Requests for Admissions | 801 Attending Hearings |
| 120 Assist at Trial | 802 Analyzing Documents |
| 121 Document Production | 803 Compiling Histories |
| 122 Discovery | 804 Retrieval of Fed. & State Bills |
| CORPORATE - 200 | 805 Research Bills/Regulations |
| 201 Bound Volumes | MISCELLANEOUS - 900 |
| 202 Mergers & Acquisitions | 901 Insurance |
| 203 Blue Sky | 902 FCC |
| 204 SEC filings | 903 Energy |
| 205 Joint Ventures | 904 International Trade |
| 206 Countertrade & Offset | 905 Bankruptcy |
| 207 Preparation of Minutes | 906 Collections |
| 208 Draft Incorporation Docs | 907 Criminal |
| 209 Stock Certificates | 908 Immigration |
| 210 Drafting Agreements | 909 Personal Injury |
| LEGAL RESEARCH | 910 Products Liability |
| & WRITING - 300 | 911 Patent/Trademark/Copyright |
| 301 Cite Checking | 912 Banking |
| 302 Shepardizing | 913 Antitrust |
| 303 Blue Booking | 914 Administrative |
| 304 Lexis-Nexis | 915 Medical Records |
| 305 Westlaw | 916 Computer Skills - IBM/Mac |
| 306 Draft Motions | 917 Government Contracts |
| 307 Draft Briefs | 918 Labor/Employment |
| 308 Draft Memoranda | 919 FTC |
| 309 Draft Pleadings | 920 Secretarial - WPM |
| 310 Library Skills | 921 Tax |
| 311 Obtaining Court Documents | 922 Transportation |
| 312 SEC Library | |
| 313 Factual Memos | |
| 314 Research at Gov't Agencies | |

FIG. 28

Employee Personal Summary Report

David Boies

| Period | Regular | OT | DT | Pay | Vacation Earned | Potential Bonus |
|---|---|---|---|---|---|---|
| 1998 January | 151.50 | 1.00 | 0.00 | $1,989.00 | 3.81 | $118.95 |
| 1998 February | 40.00 | 0.00 | 0.00 | $520.00 | 1.00 | $31.20 |
| 1998 Quarter 1 | 191.50 | 0.00 | 0.00 | $2,509.00 | 4.81 | $150.15 |
| 1998 Year to Date | 191.50 | 1.00 | 0.00 | $2,509.00 | 4.81 | $150.15 |
| 1999 May | 81.75 | 0.00 | 0.00 | $997.75 | 2.04 | $60.08 |
| 1999 June | 8.00 | 0.00 | 0.00 | $96.00 | 0.20 | $5.76 |
| 1999 Quarter 2 | 89.75 | 0.00 | 0.00 | $1,093.75 | 2.24 | $65.69 |
| 1999 July | 142.75 | 49.00 | 30.50 | $3,604.25 | 5.55 | $173.35 |
| 1999 August | 29.50 | 0.00 | 0.00 | $354.00 | 0.73 | $21.24 |
| 1999 Quarter 3 | 172.25 | 49.00 | 30.50 | $3,958.25 | 6.29 | $193.34 |
| 1999 October | 76.50 | 4.75 | 0.00 | $1,003.50 | 2.03 | $58.50 |
| 1999 November | 109.00 | 2.50 | 0.00 | $1,353.00 | 2.78 | $80.28 |
| 1999 December | 159.75 | 24.25 | 0.00 | $2,597.63 | 4.60 | $147.93 |
| 1999 Quarter 4 | 345.25 | 31.50 | 0.00 | $4,954.13 | 9.41 | $285.64 |
| 1999 Year to Date | 607.25 | 80.50 | 30.50 | $10,006.13 | 17.95 | $541.76 |
| 2000 February | 105.25 | 23.50 | 6.50 | $1,995.50 | 3.38 | $105.49 |
| 2000 Quarter 1 | 158.00 | 28.50 | 6.50 | $2,886.50 | 4.82 | $157.48 |
| 2000 Year to Date | 158.00 | 28.50 | 6.50 | $2,886.50 | 4.82 | $157.48 |

This report may not reflect recent changes. This data is the proprietary and confidentail property of LawCorps.® Unauthorized use is strictly prohibited.

Done..

FIG. 30

| LAWCORPS® | WEB DATA SYSTEM |
|---|---|

Assignment Profile

| Joshua Badach | | | | |
|---|---|---|---|---|
| Firm | Type of Work | Dates | Total Hours | Earnings[1] |
| Cleary, Gottlieb, Steen & Hamilton | 150 Antitrust | 1/17/00-1/23/00 | 8.50 | $187.00 |
| Cleary, Gottlieb, Steen & Hamilton | 150 Antitrust | 1/24/00-1/30/00 | 14.50 | $319.00 |
| Dickstein Shapiro Morin & Oshinsky, LLP | 121 Document Production | 12/18/00-12/24/00 | 17.25 | $362.25 |
| Dickstein Shapiro Morin & Oshinsky, LLP | 121 Document Production | 12/25/00-3/11/01 | 448.75 | $11,494.50 |
| Heller Ehrman White & McAuliffe, LLP | 150 Antitrust | 2/1/99-2/7/99 | 34.75 | $764.50 |
| Heller Ehrman White & McAuliffe, LLP | 150 Antitrust | 2/8/99-12/26/99 | 2,109.00 | $56,687.51 |
| Hogan & Hartson | 100 Litigation | 2/14/00-2/20/00 | 16.75 | $284.75 |
| Hogan & Hartson | 100 Litigation | 2/21/00-3/5/00 | 77.75 | $1,347.25 |
| Shearman & Sterling | 121 Document Production | 2/14/00-2/20/00 | 1.00 | $22.00 |
| Shearman & Sterling | 150 Antitrust | 2/28/00-4/30/00 | 401.00 | $10,806.00 |
| Shearman & Sterling | 150 Antitrust | 4/24/00-5/7/00 | 81.25 | $1,923.38 |
| Shearman & Sterling | 150 Antitrust | 6/5/00-6/18/00 | 85.25 | $2,021.13 |
| Shearman & Sterling | 154 Document Pulls | 10/23/00-11/12/00 | 106.50 | $2,943.75 |
| Sidley & Austin | 700 Environmental | 10/9/00-10/15/00 | 8.00 | $176.00 |

[1]Excluding any LawCorps paid bonuses.

Produced for Joshua Badach on 3/27/01 at 15:50:49

This data is the proprietary and confidential property of LawCorps® and Jashua Badach. Unauthorized use is strictly prohibited.

Done..

FIG. 31

COMPUTER-IMPLEMENTED AND/OR COMPUTER-ASSISTED WEB DATABASE AND/OR INTERACTION SYSTEM FOR STAFFING OF PERSONNEL IN VARIOUS EMPLOYMENT RELATED FIELDS

This application claims the benefit of U.S. Provisional Application No. 60/246,078, filed Nov. 7, 2000; U.S. Provisional Application No. 60/206,546, filed May 24, 2000; and U.S. Provisional Application No. 60/192,309, filed Mar. 27, 2000, all of which are hereby incorporated herein by reference.

BACKGROUND OF THE INVENTION

1. Field of the Invention

The invention relates to computer implemented or computer-assisted systems for automating information, financial and management processes, particularly for personnel and/or temporary staffing, an example of which includes temporary legal staffing.

The present invention also particularly relates to an integrated or combined system for staffing of personnel, including the ability to track project work time, project billing, project future project costs, update personnel skills and to provide performance feedback for future staffing purposes.

2. Related Art

Large quantities of data relating to personnel, financial, and management information conventionally are collected in diverse organizations. Typically, these organizations do not have available, and indeed do not collect in an automated system, a full range of information in order to make sophisticated judgments about, for example, staffing projections. Moreover, the information that is collected in the conventional systems is typically dependent on the organization ensuring that the data is kept current.

FIGS. 1–3 show a prior art human resource management system (RMS) for staffing projects which is illustrated in U.S. Pat. No. 6,049,776, which is used here to illustrate common human resource information which is stored and searched. A RMS server 11 includes a computer system 13 interface through a LAN 20 with external corporate databases shown in FIG. 2. Also illustrated is a workstation 31 through which a user may access the server.

The external databases 22, shown in FIG. 2, include numerous corporate databases storing information utilized by the RMS server, including a database 50 defining projects, tasks within projects and efforts within tasks; personnel information, skills and resumes database 51; workbench calendars 52 of individual employees utilizing personal information management systems; personnel timesheet hours database 53; project assignments database 54; corporate office communications systems 55 such as e-mail and voice mail. Project assignment and schedule change notifications are provided by the RMS server 11 through the office communication systems 55.

Further, the external databases include a skills database 56 storing skill information; database systems 57 containing information with respect to education, training and courses; an organizations database 58 containing information such as organization tiers and organization codes; and a customers database 59 containing data relating to corporate customers.

The RMS server 13 includes a system database 70 such as a skills file 71 storing skills, by employee, used in the resource search functions; a skill code file 72 having skill code and description; a calendar file 73 storing all calendar entries for scheduled activities; a holiday calendar file 74; a projects file containing project information downloaded for the database 50; a project task file 76 storing task information associated with projects; an effort codes file relating code to effort description; a technical assistance request file 78; an employee master file containing information from the database 51; a rates file 80 containing cost and list prices of personnel based on group and job classification; an external services vendor file; a resource comments file 82 containing comments about prior usage, performance, strengths and weaknesses of corporate personnel and vendors; a resume file 83; a course descriptions file 84; a course schedule file 85; and an organizations file 86.

The RMS server 13 includes an interface module 90, screen display management functionality 91; data input and output management functionality 92; calendar management function 93; resource search logic function 94; and project assignment logic function 95. There is also included a master controller for coordinating and controlling RMS functionality.

Reference is made to FIG. 3, illustrating a data flow diagram for the resource search and scheduling functions of the RMS system. The resource search function 94 accesses RMS database files 71–73, 79 and 81, as well as receiving search parameters from managers 100, in order to obtain project, personnel, skills and calendar information to satisfy a project requirement. After identifying the resource to fulfill a request, the assignment is made via the project assignment logic 95, which may be invoked internally 101 or by manager input 102. The project assignment logic 95 provides for updating the consultant's calendar 52 and notifies the manager of record and consultant of the schedule update via the office communication systems, updates the RMS calendar file 73, and enters resource assignments into the technical assistance processing systems (TAPS) 54.

In summary, traditional databases contain information from external databases and direct entry. Conventional calendar functionality, resource search and scheduling functionality, and assignment functionality is provided.

SUMMARY OF THE INVENTION

In accordance with the invention, there is provided web page integration with a relational database automates the management systems for temporary staffing for both clients and employees. An extensive database provides functionality while web page architecture brings access to clients and temporary employees. Candidates begin the application process online and manage the accuracy of their profile through database access, permitting temporary employees to update availability, experience gained after the interview and to generate reports showing hours worked on assignment, vacation pay accrued, earnings and bonuses. The database proactively seeks employee and client updates on a periodic basis as to availability and feedback on candidates in the field. Candidate database profiles are created, stored and searchable through academic, language and experience as well as "intangible" feedback gathered through the interviewing process. Online interface during the order placement process provides clients a matching to candidates through extensive, candidate-specific, searchable criteria. Searches are customized and highly detailed, covering degrees, language, schools attended, bar memberships, GAP and personality characteristics. A unique candidate summary accompanies each temporary candidate resume, providing a dossier of reference comments, interview impressions, highlights of candidate experience relating to an assignment, past performance feedback, etc. Active clients have the ability to monitor and report on their use of temporaries. This reporting functionality offers up-to-the minute management and financial details such as total and average costs, average bill rates, costs per project, cost per contact, breakdowns by job types, and breakdowns by reference numbers. Tracking systems allow clients to summarize all temporaries working with them according to areas such as dates worked, tasks performed, and client-specific performance feedback.

The CaseManager™ reporting function offers an up-to-the-minute look at management details such as total and average costs, average bill rates, costs per project, cost per contact, breakdowns by job types, and breakdowns by reference numbers for employees working for the client. The ClientMonitor™ is a highly detailed tracking system that allows firm managers to track all the employees who have worked at the firm according to such areas as dates worked, tasks performed, and client specific performance feedback. The SCORE™ client feedback (submission and historical review) provides clients an easy, preferably on-line system for feedback on temporary employees. It ensures quality control through the duration of an employee's assignment and gives clients a hand in recognizing and rewarding a job well done. It also serves as a way to measure qualitative performance for employee bonuses.

The CorrectMatch™ search for candidates is a comprehensive matching tool. Searches are customized and highly detailed, covering degrees, languages, schools attended, bar memberships, GPA and the like. Online interface advantageously provides clients an immediate and accurate matching of candidates for particular job skills. A client having submitted an order, they are provided with Assigned Candidate Profiles™. A candidate profile accompanies the candidate's resume, providing clients with a solid dossier of a candidate, providing in-depth information not found on a resume. This includes a summary of reference comments, insightful interview impressions, highlights of candidate experience relating to an assignment, past performance, feedback, etc. Through use of the database and web site, this profile and resume can be submitted electronically to the client.

On the candidate side, the system provides an update of availability for temporary work. Candidates will be able to log on to the web site and advise of their availability for temporary work. Also, status check functions can be automated, such as through e-mail. Status check calls are made, preferably on a regular schedule to maintain continued contact with employees, verifying availability for temporary work. This process ensures the integrity of the pool of candidates and can be done via e-mail. Further, the system provides the ability to directly add experience gained in the database profile. The experience evaluation form in a candidate's file provides a quantifiable sense of the candidate's level of experience in all practice areas. Candidates will be able to log into their file, and update experience levels as they are developed, to provide an up-to-date and comprehensive overview of experience. The system also provides a way for employees to review the personal profile, such as hours worked, nature of work, earnings, vacation time accrued, and potential bonus earned. An electronic timesheet is provided, to streamline employees' time tracking for clients.

DESCRIPTION OF THE FIGURES

The above-mentioned and other advantages and features of the present invention will become more readily apparent from the following detailed description and the accompanying drawings, in which:

FIGS. 16 and 17 are exemplary user interfaces for the ClientMonitor™.

FIGS. 18A–B and 19 are exemplary user interfaces for the CaseManager™.

FIGS. 21A–E are an exemplary user interface for the CORRECT MATCH ORDER.

FIGS. 22A–C, 25, 26A–B, and 27A–C are exemplary user interfaces for the Assigned Candidate Profile™.

FIG. 28 is an exemplary user interface for the experience evaluation form.

FIG. 30 is an exemplary personnel summary report.

FIG. 31 is an exemplary assignment profile.

DETAILED DESCRIPTION OF THE PREFERRED EMBODIMENT

The following detailed description of preferred embodiment(s) includes many specific details such as report formats and file contents. The inclusion of such details is for the purpose of illustration only and should not be understood to limit the invention.

The system is intended to provide an information management system, as a tool for collecting, analyzing, predicting, and providing custom reports. It also provides a process for employees or personnel to be selected to correspond to client or employer needs, and a process to collect and interpret feedback on employee/personnel and client/employer performance. The information is intended to be provided in an interactive environment, preferably via a web database available over the Internet. Moreover, in preferred embodiments, the system both provides information in response to request, and requests information to ensure that information is current.

The preferred environment for the system is in connection with legal temporary staffing. Nevertheless, the system applies to any staffing needs, legal or otherwise, and temporary or otherwise. The invention applies to all areas of staffing for employment-related or business-related activities.

A staffing provider, such as a legal temporary agency, tends to be a funnel through which a large amount of highly useful information passes. On the other hand, although the clients of staffing providers might have access to this information (such as in paper invoices), they have no incentive to devote the manpower to collecting this information. This information, if collected, organized and analyzed, can be leveraged to provide additional services or advantages to clients from staffing providers. This is particularly true where the information is collected from multiple clients.

The system encompasses functionality that includes a web or internet-enabled interaction system, and other functionality outside of traditional data base reports, which will be provided to clients and employees preferably on line or through any standard data delivery mechanism. In addition to web-enabled interaction, the invention includes the use of email and pagers and other conventional types of interactions.

By way of background, the system recognizes at least three categories of users: employees, clients and contacts. Clients are companies that have needs to employ individuals, preferably by temporary employment. Contacts are provided, corresponding to each client. Multiple contacts may be provided for each client, different contacts corresponding to different levels of access the client has to the system. Employees are individuals that are available for employment by clients.

Figure 1:
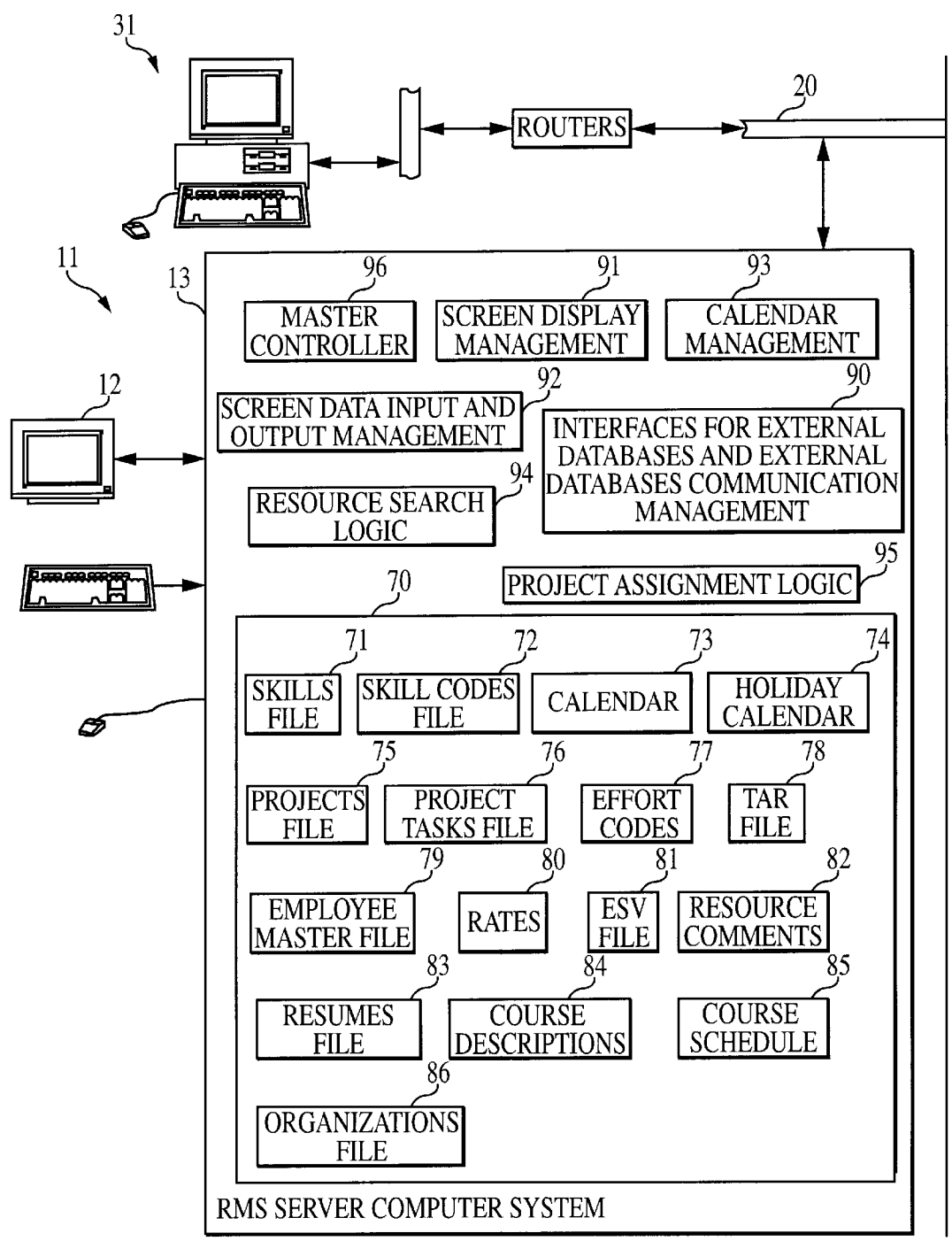
FIG. 1 is a schematic diagram illustrating a prior art RMS server and internal databases.
Figure 2:
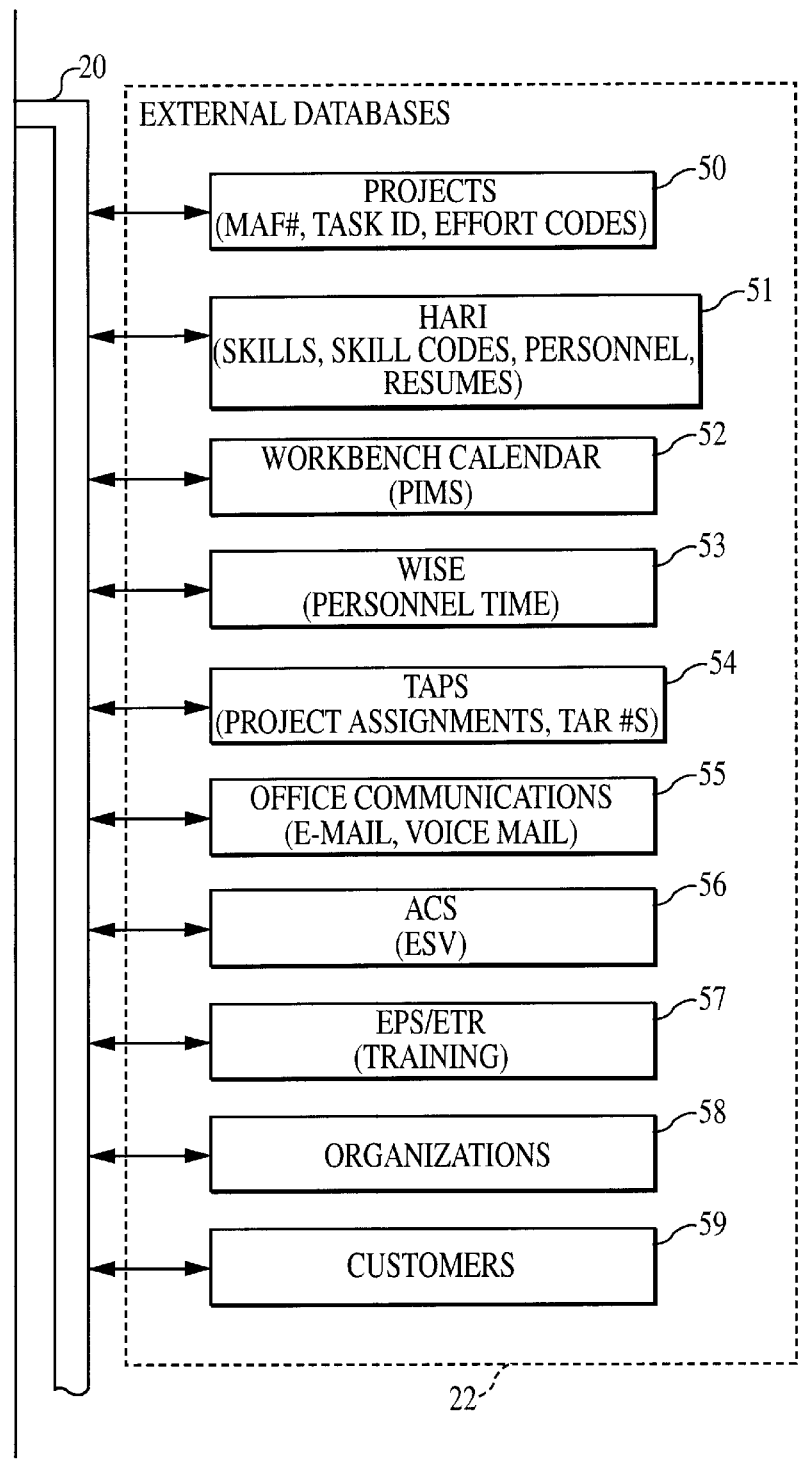
FIG. 2 is a schematic diagram illustrating prior art corporate external databases interfacing with the RMS server of FIG. 1.
Figure 3:
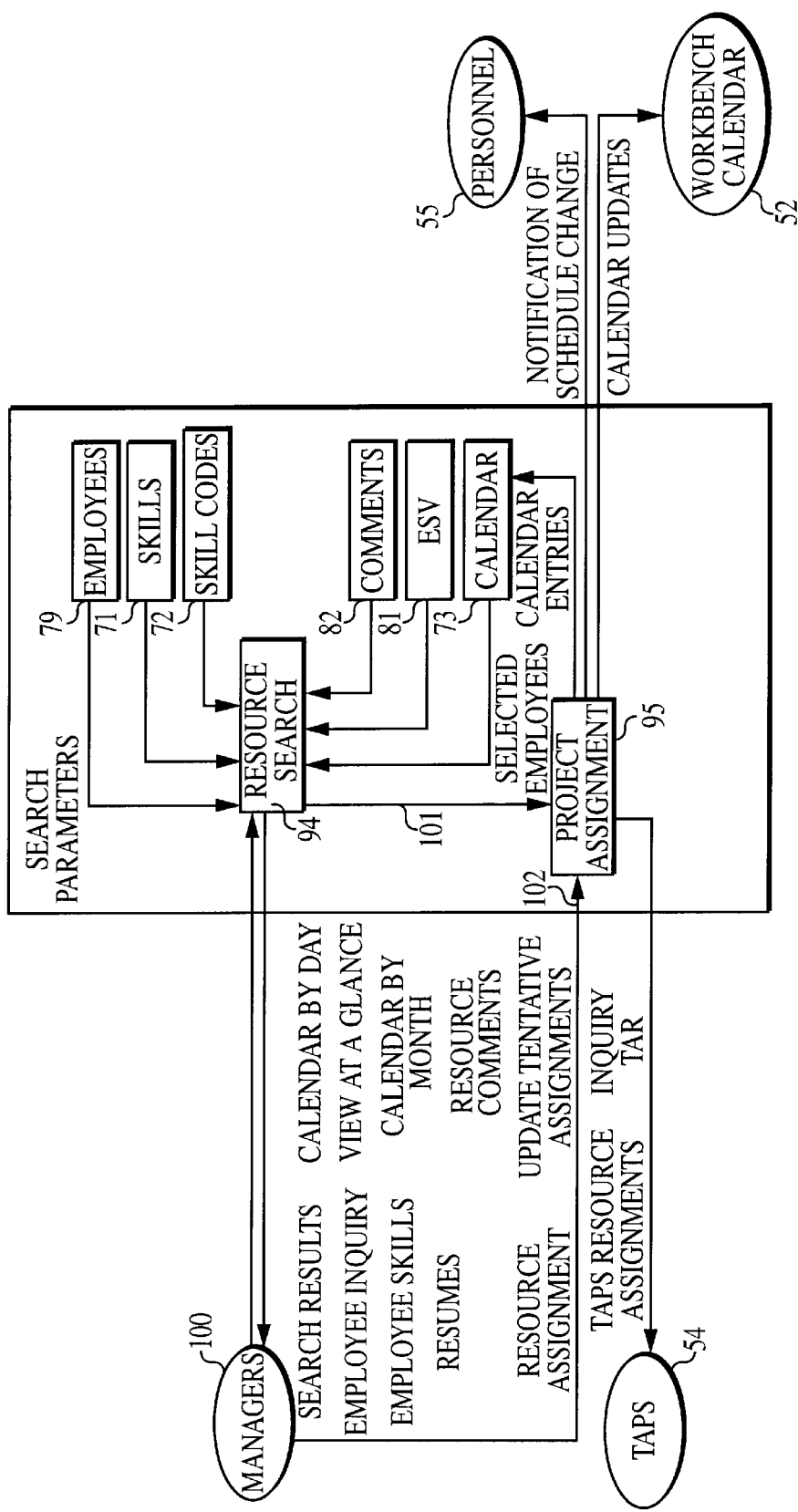
FIG. 3 is a data flow diagram illustrating resource search and scheduling functions of a prior art RMS server.
Figure 4:
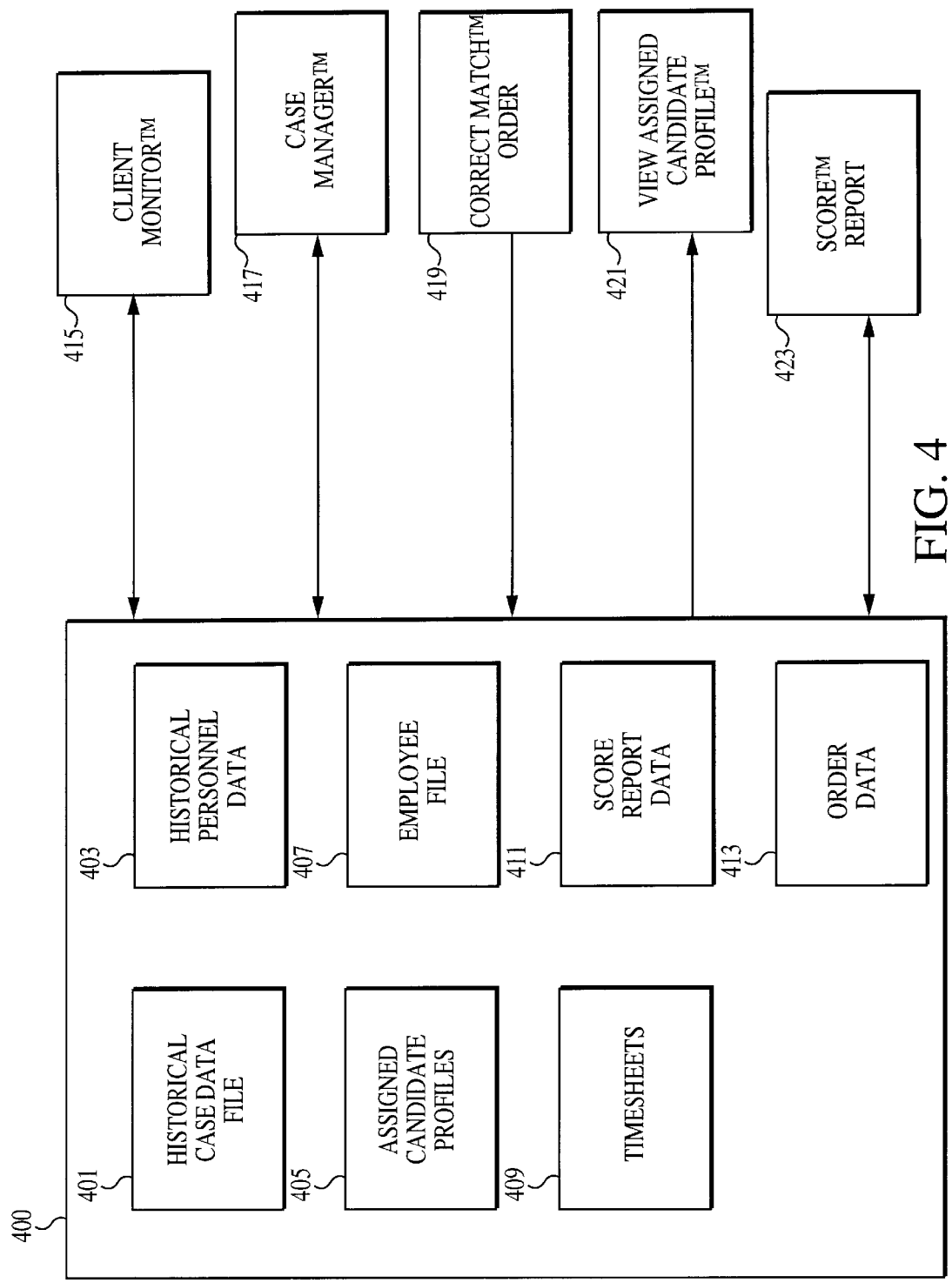
FIG. 4 is a data flow diagram illustrating the database and client user interfaces according to one embodiment of the present invention.
Figure 5:
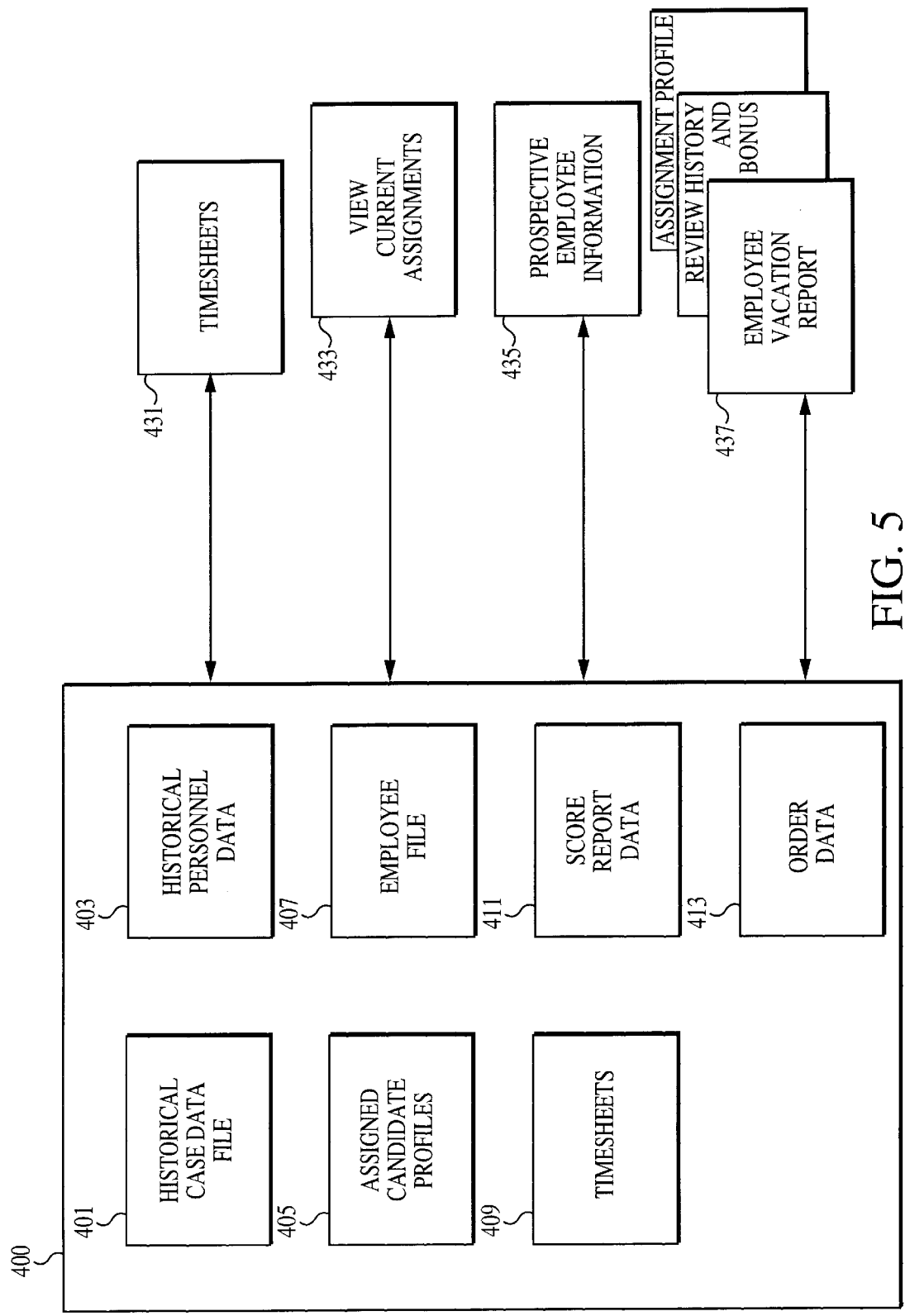
FIG. 5 is a data flow diagram illustrating the database and employee interfaces according to one embodiment of the present invention.

Reference is made to the data flow diagram in FIGS. 4 and 5, illustrating the database and client user interfaces and employee user interfaces, respectively, according to the preferred embodiment of the invention. As shown in FIG. 4, the system includes database 400, and client-side reports 415, 417, 419, 421, 423. From a conceptual perspective, the database include a historical case data file 401, historical personnel data 403, Assigned Candidate Profile™ 405, employee file 407, timesheets 409, SCORE™ report data 411, and order data 413. The database is utilized to provide to clients various reports, including a ClientMonitor™ 415, CaseManager™ 417, CORRECTMATCH™ order 419, View Assigned Candidate Profile™ 421, and SCORE™ Report 423. FIG. 5 illustrates the employee-side reports, including timesheets 431, View Current Assignments 433, Prospective Employee Information 435, and various reports which can be summarized as Employee History 437. The same database is used for the employee-side and client-side user interfaces. The databases collect information regardless of whether the information originates from the client or employee.

There is not necessarily a direct correspondence between the illustrated conceptual database and the actual implementation of the database. For example, in the preferred embodiment, the database is a single relational database. Information that is used in client-side reports overlaps information that is used in employee-side reports. For example, the fact that a particular employee worked for a particular client during particular times would ultimately be used in both client-side and employee-side reports. Exemplary reports are discussed in detail below.

As alluded to above, various reports are provided by the system. These reports provide information that is useful to employees as users (shown in FIG. 5), or to clients as users (shown in FIG. 4). Thus, access to types of reports is preferably restricted by type of users. The type of user is advantageously specific via a log-in.

Various information is collected, stored and used by the system. The information is advantageously stored in electronic format. Preferably, the information is stored in a relational database. In the most highly preferred embodiment, the relational database may be developed in an environment such as the $4^{th}$ DIMENSION™ environment, available from 4D, Inc. Alternative databases are possible.

The system collects and stores, in the database, information that is pushed at it ("push information"), for example, employee information including the initial resume. The system also actively pulls information ("pull information") into the database, for example, feedback on a particular employee for a particular project for a client, or checking whether employee information is current. Further, the system correlates information that is collected relative to one item of information, to information that is provided relative to another item of information ("correlated information"), such as feedback by particular clients for a particular employee.

Database

Figure 14:
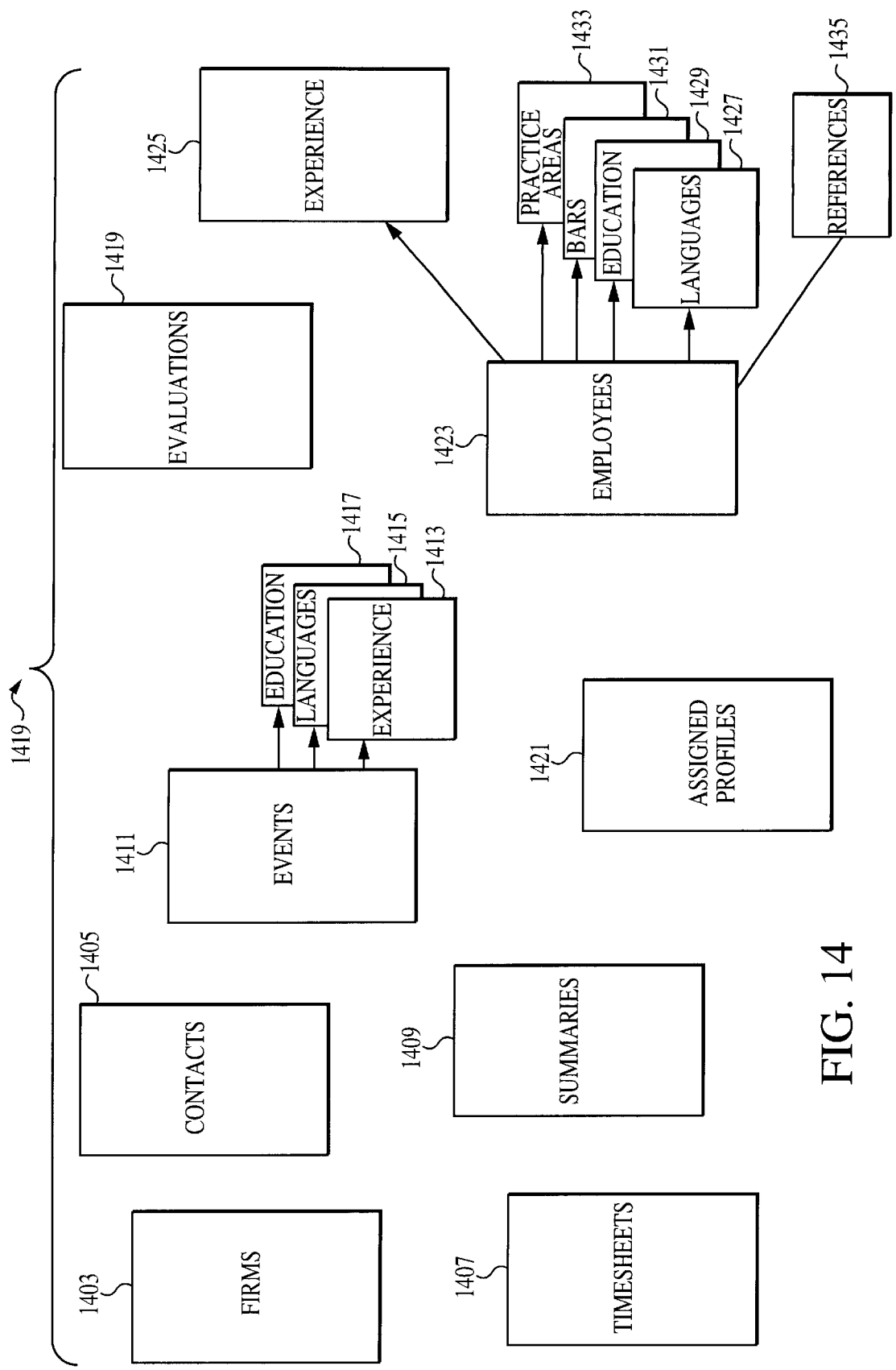
FIG. 14 is a schematic of an exemplary relational database for the invention.

FIG. 14 is an illustration of the preferred embodiment of the database. The preferred embodiment provides a relational database 1401. The tables included in the relational database are firms 1403, contacts 1405, timesheets 1407, summaries 1409, events 1411, evaluations 1419, assigned profiles 1421, and employees 1423. The events table 1411 references details for each requested order such as experience 1413, languages 1415, and education 1417. The employees table 1423 references details for each employee such as experience 1425, languages 1427, education 1429, bars 1431, practice areas 1433, and references 1435.

Advantageous keys for the database include Firm ID, Report ID, Contact Id, Employee ID, Timeslip ID, Summary ID, and Event ID. Keys are also included for details that repeat, such as skills.

The firms table 1403 includes data on the client firm, such as the firm name, address, phone number, fax, status, region, branch offices, numbers of attorney and paralegal staff, preferences, experience, contacts, etc.

The contacts table 1405 includes information on the contact at the client, such as the name of the contact, title, actions, practice group, secretary, etc.

The timesheets table 1407 includes timesheet information, such as the employee ID, the firm ID, the contact ID corresponding to the contact that initiated the placement, the timing of the work, amount of regular, overtime, and double time, pay rate, billing rate, type of work, total bill, total paid, the assignment, and the event ID.

The summaries table 1409 includes the summary ID, the employee ID, the firm ID, the contact ID, the period of the summary, the amount of regular, overtime, and double time, amount billed, amount paid, billing rate, pay rate, vacation earned, potential bonus, paid bonus, and compensation rate.

The events table 1411 includes information relating to orders (events) that have been placed for staffing, including event ID, contact ID, sales representative ID, firm ID, preferences, total bill, comments, order data, order time, work type, experience required, duration, overtime, number of personnel needed, report to location, job details, the employee, education, languages, experience, start date, end date, the work ID, referenced number, and an indication whether the order was filled.

The evaluations table 1419 includes feedback from the client regarding an employee. The table includes the employee ID, month, year, and evaluations such as punctuality, productivity, job skills, attitude, competence, professionalism, reliability, and organizational skills. Also included are the event ID for the project resulting in the evaluation, comments, hours, bonus, and whether the project was completed.

The assigned profiles table 1421 includes information on potential employees which meet a client's request (as explained below in details). The assigned profiles table includes the employee ID, the requesting firm ID, the expiration date, the profile ID, the experience category, and the employee name.

The employees table 1423 includes information about each employee. Such information includes the employee ID, name, address and contact information, tax information such as W4 exemptions, social security number, date of hire, interviewer, experience and interview date. Also included are soft evaluation data, such as appearance, bearing, expression, job knowledge, motivation and personality. Also included are hard criteria, such as languages, education, law schools, and bars. Further included may be references. Also, according to highly preferred embodiments, test data is included, such as a litigation test, a corporate law test, a citations test, or other tests. Employment information is included, such as start dates and finish dates, wages, vacation earned and taken, salary, and minimum rate.

Other tables may be included. For example, it may be desirable to include the references for each employee in a reference table.

System/User Interaction

In the preferred embodiment, the user logs in, and enters the user's identification information and a password. This enables the system to properly identify the type of user. A user may log in as a client contact or an employee, as identified by the user name that they have been provided.

It would be appropriate for the system to display a disclaimer conventional for logins on the internet or web-based systems. Moreover, in highly preferred embodiments, the system has sufficient security so that unauthorized users cannot proceed.

Figure 15:
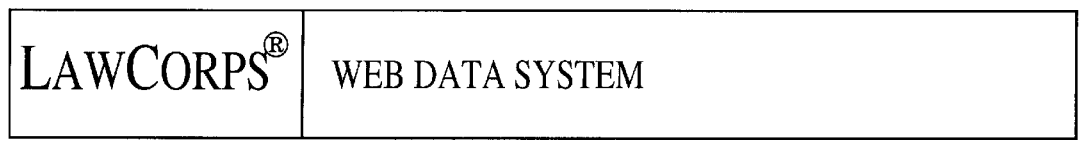
FIG. 15 is an exemplary user interface for the initial menu.

The system provides a number of processes that users may utilize in order to correlate and analyze relevant information collected in the database. In the preferred embodiment, a user interface is provided to these processes. The user interface preferably provides these in a menu-driven format. An example menu is illustrated in FIG. 15.

As shown, the system presents a clear menu of options, advantageously avoiding the need for users to drill down. Several standard reports for clients are provided; a client should not need to search deeply into the data base system to uncover common requested information, such as recent billing.

The example menu presents different reports; in this example, five are provided, including "view CaseManager™" 1501, "view ClientMonitor™" 1503, "enter SCORE™ report" 1505, "place CORRECTMATCH™ order" 1507, and "view ASSIGNED CANDIDATE PROFILE™" 1509. Each of these reports is discussed in more detail below. The reports that are provided in any particular embodiment may differ; for example, there may be fewer or more reports, the reports may have different titles, and/or different reports utilizing similar overall concepts may be presented.

ClientMonitor™

Figure 6:
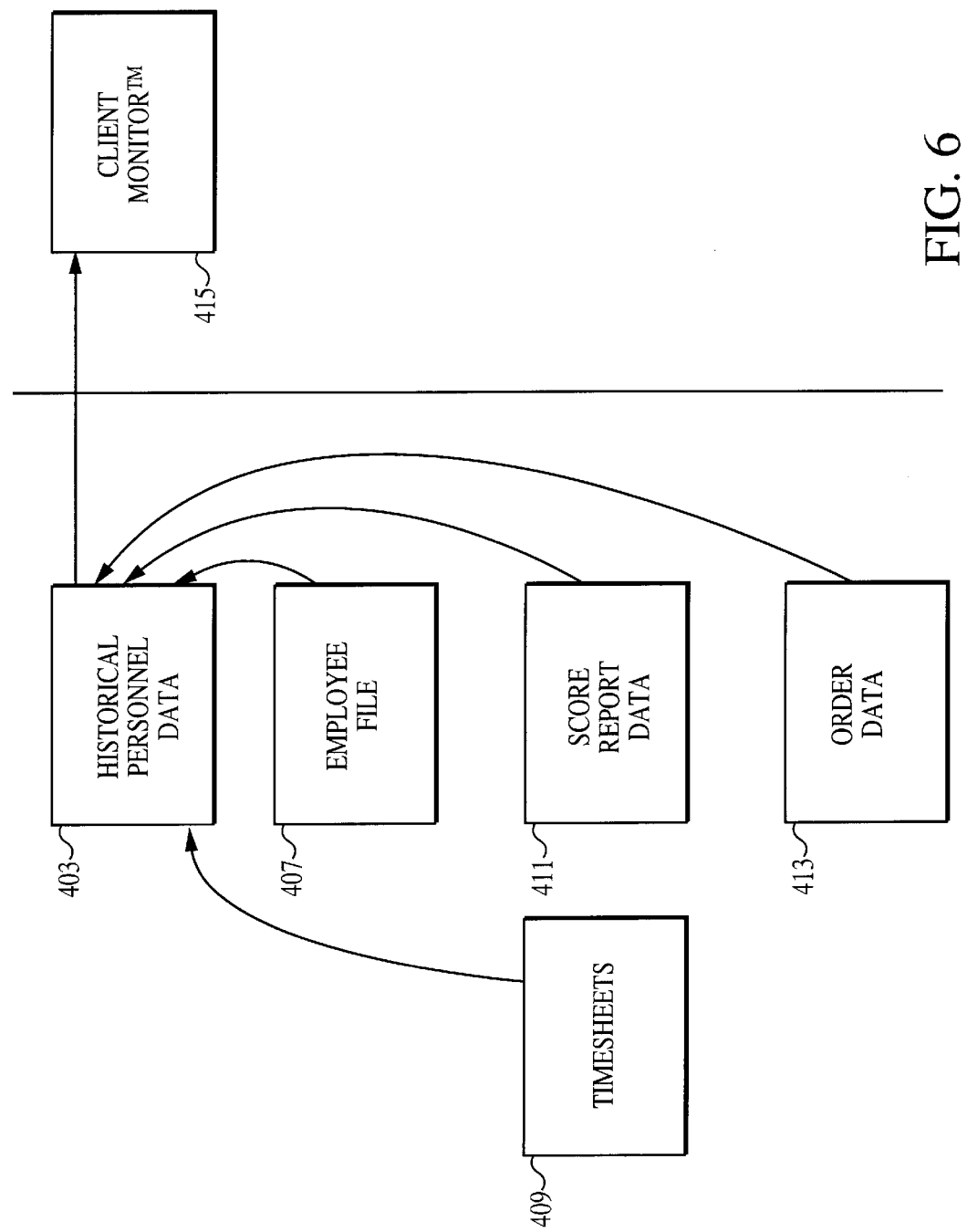
FIG. 6 is a data flow diagram illustrating the database and ClientMonitor™ client user interface.
Figure 16:
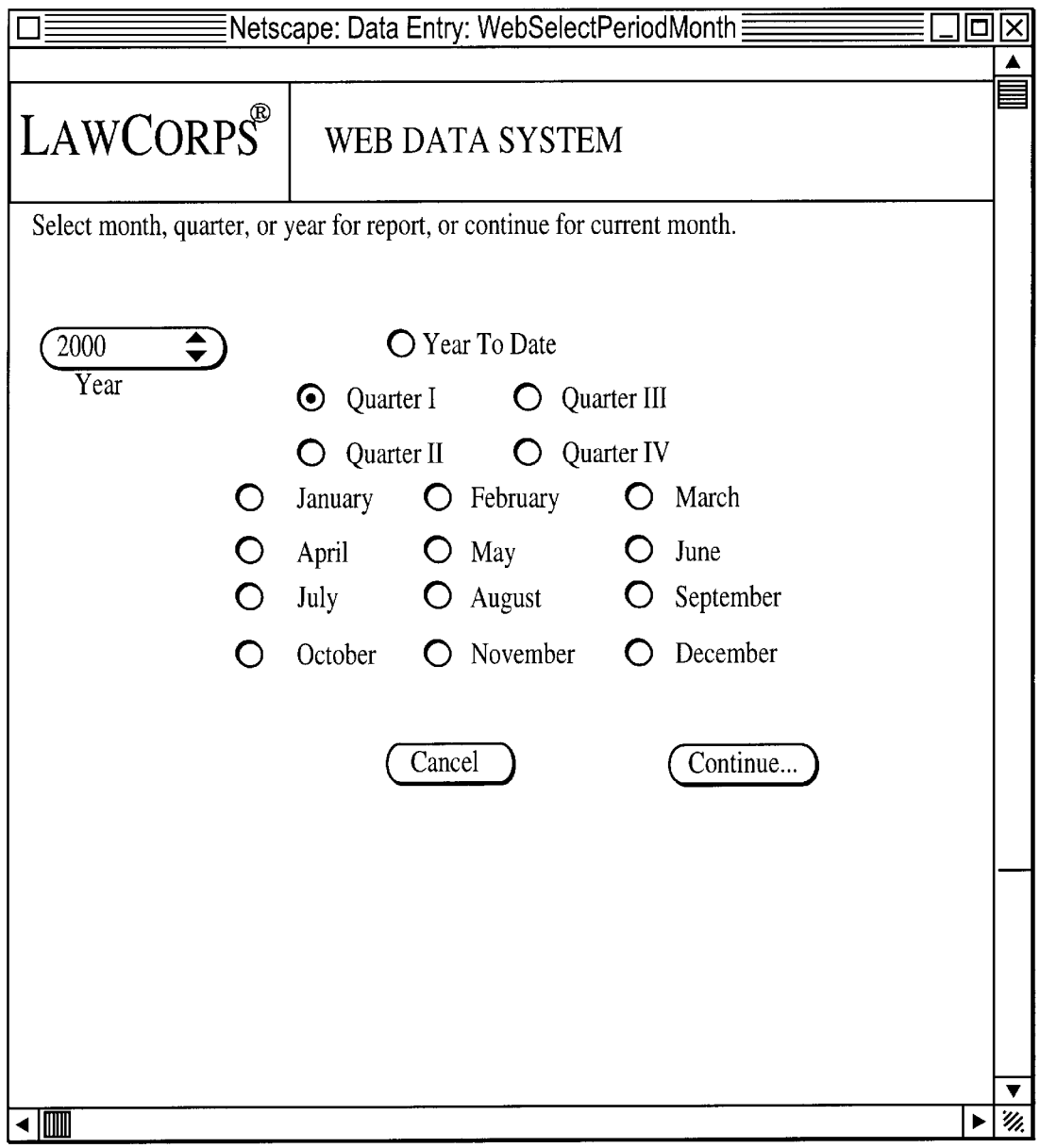

Reference is made to FIG. 6, showing the ClientMonitor™ interface 415 utilizing a portion of the database, and FIGS. 16–17, exemplary displays of a ClientMonitor™ menu.

The ClientMonitor™ report is a personnel management report or tool, and focuses more on the personnel aspects and less on financial aspects of the information. It is intended to enable the client to look at the specifics of candidates that were working in the client firm, what those candidates were doing, what dates they worked for the client firm, the total hours worked by that candidate at that firm, and the scores the candidates received from the firm.

The SCORE™ will be described in detail below, and is based on a client feedback report system, which allows the client to evaluate employees, on a periodic basis, interactively and preferably online. Once the client has returned a feedback report for an employee to the system, the SCORE™ for that feedback is then reflected on the ClientMonitor™.

The value to the client is this. If the client uses a large number of temporary employees and desires to hire more temps, for example three months later and the client does not recall its evaluations of the temps, the client can access the system, retrieve the ClientMonitor™ report corresponding to the client firm by various criteria, review the temps employed there, what they were doing, and determine which of the temps received the best feedback as determined by the client. The client can view those temps that it gave the highest scores, and place a request for those temps it ranked most highly. This can advantageously be used as a guide for interactions with the CaseManager™ and case workers. If, for example, an employee ranked an 80%, this would indicate perhaps a transient problem, and it may or may not be a reason not to call that person back. In sum, the client manager provides a personnel management tool for clients. Furthermore, the report provides a precise tracking and management tool for staffing in the client firm.

As illustrated in FIG. 6, the ClientMonitor™ 405 draws from various portions of the database in order to provide the report. The historical personnel data 403 is utilized, drawing from timesheets 409, employee file 407, SCORE™ report data 411, and/or order data 413. The order data 413 reflects the projects that the client requested; the SCORE™ report data reflects the evaluations the client gave each employee; the timesheets reflects what the employee did for the client; and the employee file provides specific information on the employee.

FIG. 16 is an exemplary display of the ClientMonitor™ report. In the preferred embodiment, there are provided different levels of detail in the report. A user may select one or more of these items; in the example provided they are arranged in pyramid, year to date, quarters or month. This particular interface provides that the user may readily view a desired level of detail.

FIG. 17 is an example of the detailed ClientMonitor™ report. In the example, there is provide the employee name, type of work, dates of employment, total hours worked, and the SCORE™ given by the client.

CaseManager™

Figure 7:
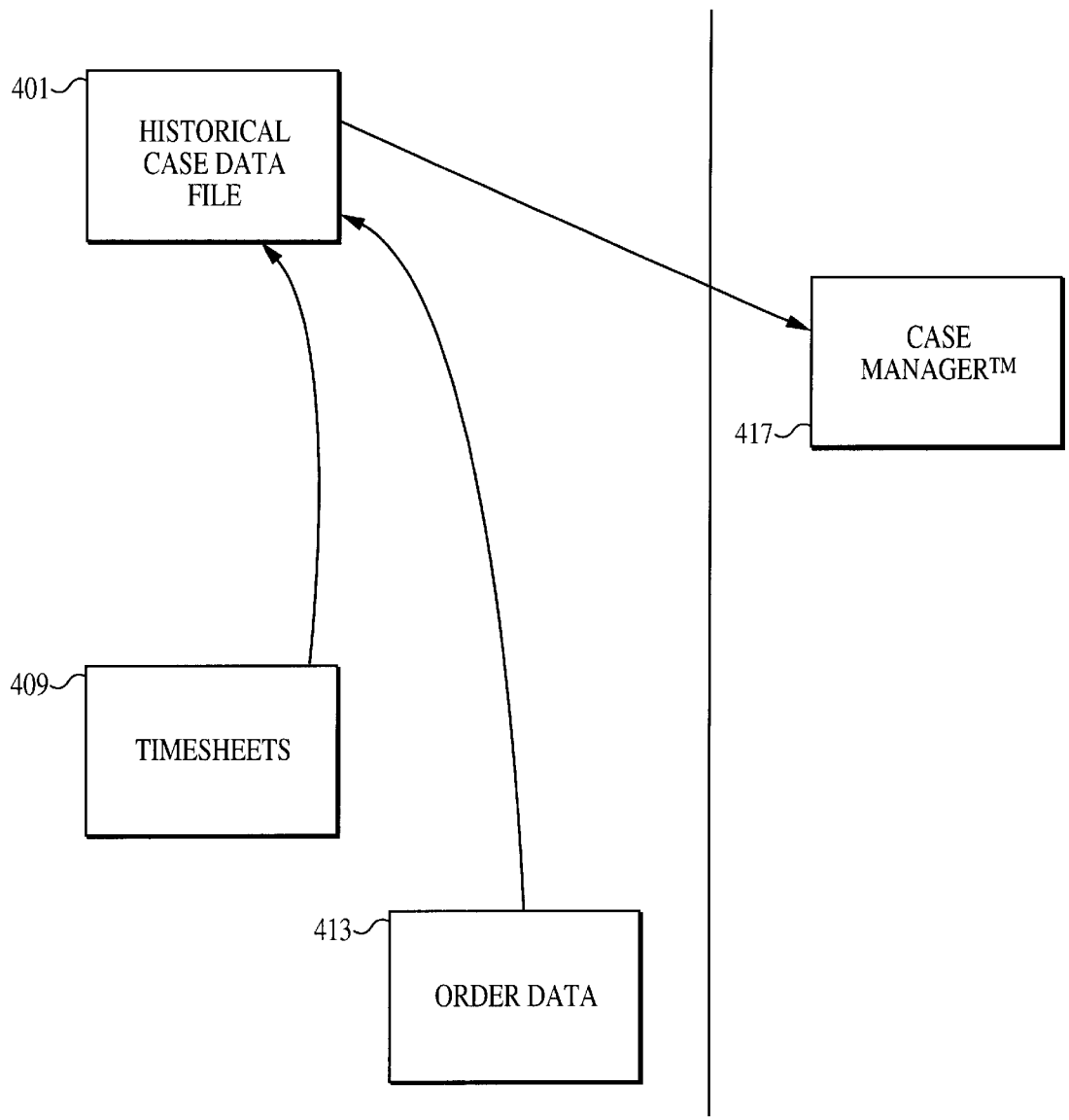
FIG. 7 is a data flow diagram illustrating the database and CaseManager™ client user interface.

Reference is made to FIG. 7, showing the CaseManager™ interface 417 utilizing a portion of the database, and FIGS. 18A–B and 19, exemplary displays of a CaseManager™ menu.

Advantageously, a dialogue requests the client to select the period of time in which they are interested. The CaseManager™ then provides what is, in effect, a temporary employee management system. It allows the system to show, to a client or other requestor, great detail about the client's historical financial data, such as total and average cost, average bill rates, cost per project, cost per contact within the client who placed the order, break-downs of employees by job type, break-downs by case reference numbers or project numbers, etc.

For example, a client may want to know what the personnel or temporary staffing budget was for a particular case or for a particular attorney. It could be any kind of detail they want. The preferred embodiment of the system track provides this collected information according to the client's contact, as well as by case. (A case would be, for example a particular litigation.)

The system will track the personnel or temporary staffing of the case or project, optionally with a budget for personnel/ temps for the particular case. A client will likely want to know, for internal purposes, how they are budgeting money. For example, the managing partner may want to know what the client firm spent on temporary attorneys on, e.g., the AT&T case last quarter. The client can access the system, request the CaseManager™ report, and determine the money that was spent on that case.

Most law firms cannot manage this level of information efficiently, and would need to review the invoices submitted by the staffing agency or temporary agency, and determine which employees were assigned to which case, and so forth, before being able to do the analysis. The invention beneficially provides one place where that information can be readily accessed in accordance with one embodiment.

The present invention is able to efficiently collect and track information, and then leverage the power of the collected information in a database for the clients.

As described below in more detail, the CaseManager™ information can be utilized not only for actual budgets, but also for future budgets. For example, in the context of a litigation, where the client of the staffing agency is a law firm that further represents a client in a litigation, the law firm could theoretically pull out of a case quickly based on the predicted amount of budget when the law firm's client gets too far behind in payment of the bills, before the case gets too close to trial. Since the system tracks the actual budget, it is possible to send an accurate bill very quickly.

In sum, this report provides a virtual management of entire personnel, staffing and/or legal teams. The invention provides the client with a much greater degree of management and control and leverage by using information tools. The direct interaction is to be distinguished from a less desirable conventional quarterly printable report.

This is based on a database management system that provides programming tools in the database server. It is therefore very efficient for this process since all of the calculations can optionally be performed on this server.

As illustrated in FIG. 7, the CaseManager™ 417 draws from various portions of the database in order to provide the report, and breaks the information down in a manner which is comprehensive and easy to understand. The historical case data file 401 is utilized, drawing from timesheets 409 and order data 413. The order data 413 reflects the projects that the client requested; and the timesheets reflects what the employee did for the client.

Reference is made to the exemplary case management report, FIGS. 18A–B. Again, it is intended that the user should be able to directly access the usual levels of detail. In the preferred embodiment, the connection is made via the Internet to a server and the server transmits an HTML table.

In this report there is displayed a quarterly summary and combined totals broken down by hours, rate and total costs, which is further broken down between regular hours and overtime hours, followed by a total line and weekly averages. Thus, the report displays the client's usage on an average basis for that quarter, and may break it down to quarter detail by client reference and order number to indicate the number of days in which at least employee at the firm.

In the particular example, a display of 88% would indicate that 88% of the time, employee(s) were provided to the firm. The displayed averages are the hours averaged per week for each individual. The next area, in the example, is a quarterly detail. The first section is by client reference and order number. The order number is an internally generated sequence number. The next item, which is blank in the given example, is the client provided reference number. A client can request that invoices track by the client's own case reference number. The storage of the case reference number in the system provides another level of searching and analysis.

The illustrated example report breaks down the information, by regular hours, overtime hours, regular cost, overtime cost, total cost, and percentage cost so the client can determine what portion of their budget that was expended on each case. The report can also optionally be broken down by type of work, as shown in FIG. 19.

Reference is now made to the CORRECTMATCH™ order interface, discussed in detail below, which provides information utilized by the CaseManager™. One of the CORRECTMATCH™ order functions is a table that breaks down experience levels by practice area as well as by task, referred to herein as an experience evaluation sheet. That experience evaluation sheet is filled out on the employee side of the database, and the table cross-references to the client side in the order section. Because the system collects this data it can now break down and display in the CaseManager™ Report exactly what the order had requested regarding specific skills. In the given example here, the client ordered people to do basic litigation work, coding work and miscellaneous work, and the CaseManager™ report breaks state down according to those types of work. Again, the exemplary report shows regular hours, overtime hours, regular cost, overtime cost, client contact name, etc. (The client contact name is advantageously displayed since often a client firm will want to know who is ordering the personnel and/or temps.)

In sum, there is a suite of functionality that is provided. The data is already packaged in summary form. There are a number of other ways that collect and analyze the data and provide reports to users. In alternative preferred embodiments, HTML is optionally utilized to package and present the data.

There may be a wide variety of transaction levels so that users may create their own reports.

SCORE™ Report

Figure 9:
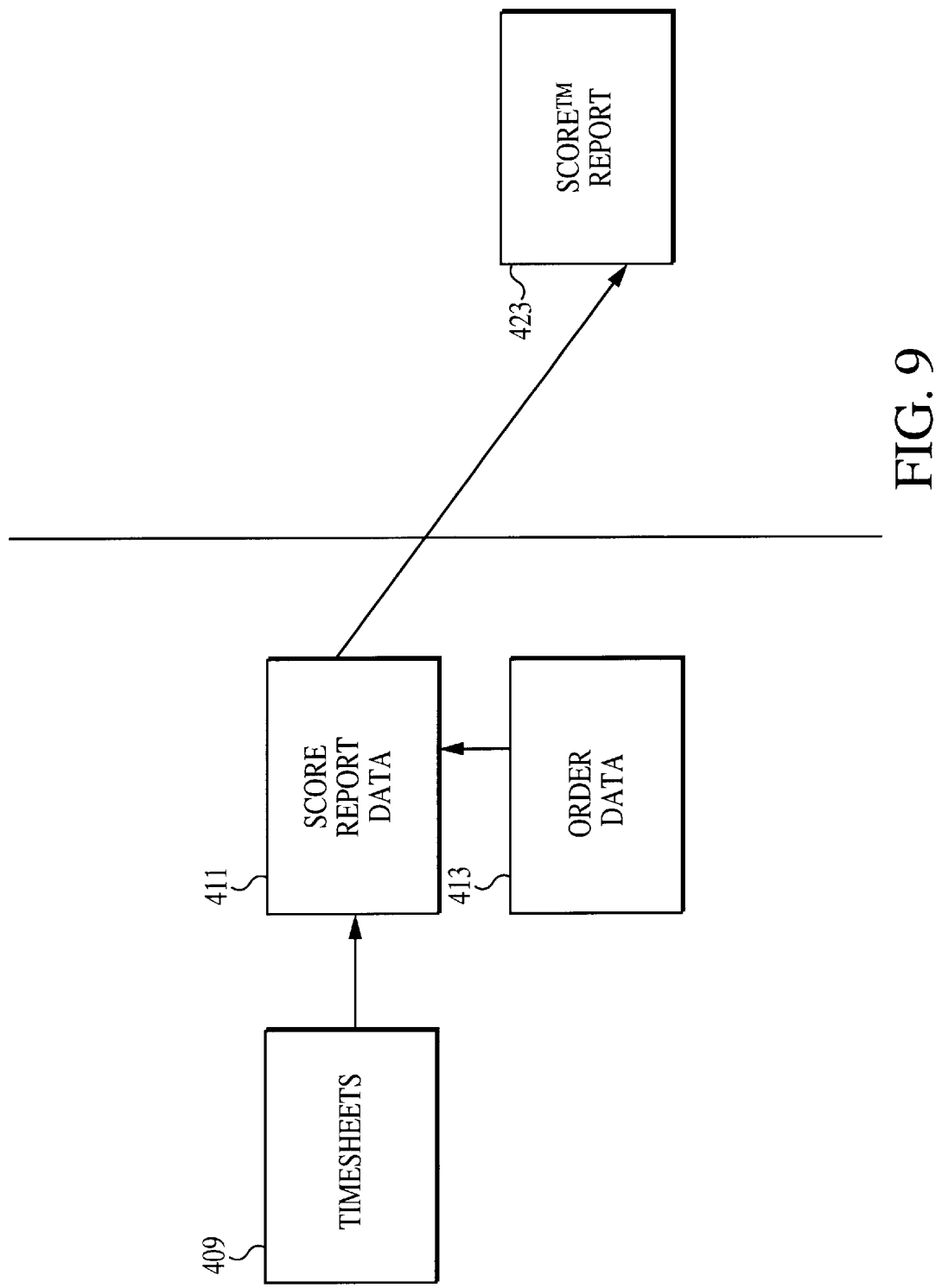
FIG. 9 is a data flow diagram illustrating the database and SCORE™ Report client user interface.
Figure 20:
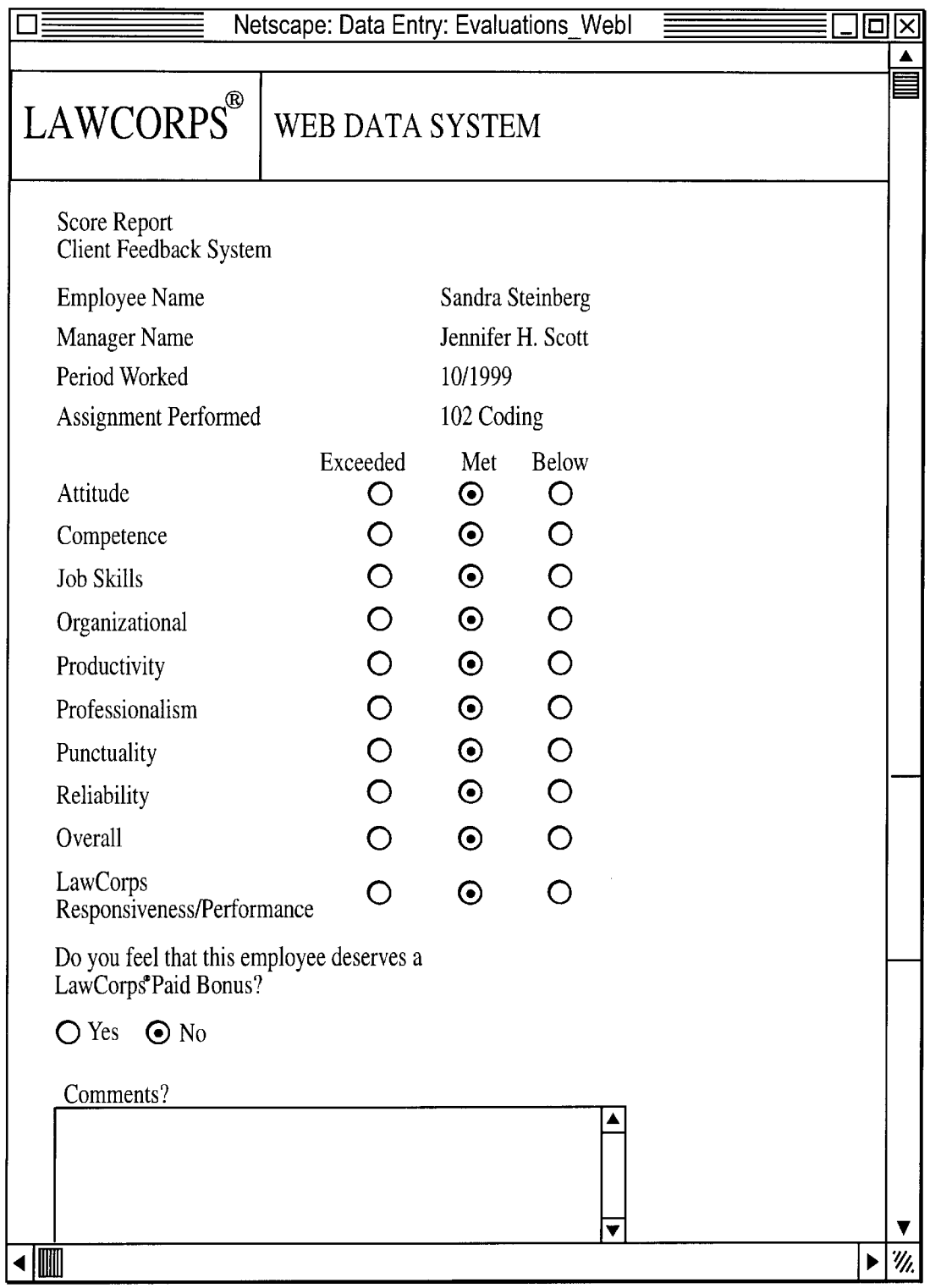
FIG. 20 is exemplary user interface for the SCORE™ report.

Reference is made to FIG. 9, showing the SCORE™ report interface 423 utilizing a portion of the database, and FIG. 20, illustrating an exemplary display of a SCORE™ report interface. The SCORE™ report criteria allows the client to evaluate an employee, and later to request employees based on its own recommendations or feedback.

The SCORE™ report interface 423 interacts with the SCORE™ report data 411, utilizing information from timesheets 409 and order data 413, to determine which employees need evaluations for which projects.

In the preferred SCORE™ report interface, there are provided standard criteria that the client is to input, and there is also provided a free form comment box where the client may input comments regarding the employee. (Note that, as shown in the CaseManager™ report, an indication is provided when there is no SCORE™ evaluation available to be displayed, to indicate that the client has not provided the evaluation. This encourages the client to input the evaluation.) The SCORE™ information is preferably entered on-line so as to avoid completing and faxing forms that must later be entered into the system, however, other data entry methods may optionally be utilized.

According to preferred embodiments, the system is partially or completely automated to the extent that the data base can internally track the time of the month and email each client who has employees working for them in the prior month. The system optionally requests the client to complete a SCORE™ report online.

Additionally, employees are provided a bonus based upon the feedback input by clients. The bonus is paid to employees and is an incentive to employees to keep the productivity where it was the prior month. Thus, the clients have an incentive to fill out the SCORE™ reports.

As noted above, the SCORE™ report will then be used to fill in the ClientMonitor™ report.

In order to complete the form, the system optionally displays a listing of employees working for the client. An employee may be selected, by clicking on the arrow next to employee name. There is provided a simple way, as illustrated, for the client to indicate the employee's performance, such as "Met Expectations", "Below", "Exceeded" and the like.

This data is used to determine a SCORE report grade, somewhat similar to a grading system. Alternative embodiments utilize a hundred point scale, that is, a 100% scale result. The immediate feedback provides the ability for the employee to immediately correct his or her performance.

CORRECTMATCH™ Order

Figure 8:
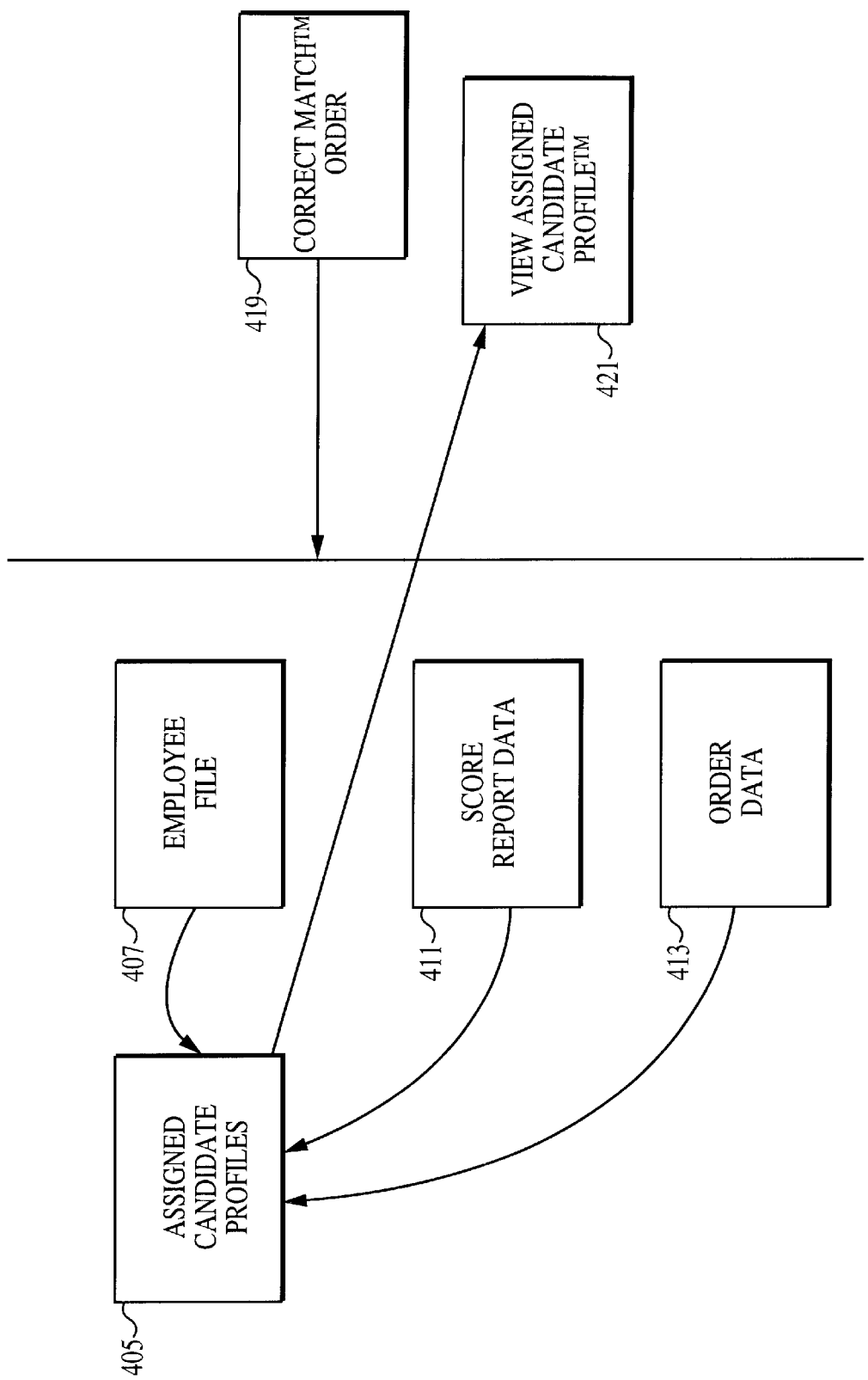
FIG. 8 is a data flow diagram illustrating the database and CORRECTMATCH™ and view Assigned Candidate Profile™ client user interfaces.

Reference is made to FIG. 8, showing the CORRECTMATCH™ order interface 419, along with the View Assigned Candidate Profile™ interface 421 (described in detail below) utilizing a portion of the database; and FIGS. 21A–E, an exemplary display of a CORRECTMATCH™ order interface. This order assists the client in requesting employees.

The CORRECTMATCH™ Order, shown in FIGS. 21A–E, is another report on the client side. According to the preferred embodiment, a particular contact at a client is logged in. The contact is prompted to enter details relating to the employee skills, etc. that are requested. This tool is a comprehensive matching tool that reviews the data resident in the database.

The clients can optionally have a great degree of specificity in terms of their request since a large amount of information is captured in the data base through our interview process and other processes. The client can initiate a request for searches on line with regard to information that has been collected, such as degrees, languages spoken, fluency, schools attended, top schools, ivy league schools, bar memberships, GPA, etc.

The system ultimately provides, via the View Assigned Candidate Profile™ interface 421, with the employees that seem to meet the search criteria. There may be a manual portion of the selection process if desired. For example, the order may be reviewed and then an appropriate search itself manually constructed.

Once the order is submitted, the order is stored in the database in the order data 413. In alternative preferred embodiments, the order is not automatically filled by a particular employee. Rather, the system locates a set of apparently qualified candidates to fulfill the specifications provided by the client. For example, a client might request an attorney who has two years experience doing coding and ERISA work. The system searches the database and selects the employees who have that specific experience.

According to one embodiment, the system draws information from the order data file 413, the scored report data 411, and the employee file 407, to select a set of "candidate" employees. The candidate employee information is then stored as the Assigned Candidate Profile™ file 405, which may later be presented to the client for further selection of a candidate (described in detail below). Preferably, the Assigned Candidate Profile™ file 405 expires after a certain amount of time, or is eliminated when the client selects one of the candidates as an employee.

Assigned Candidate Profile™

Reference is made to FIG. 8, also showing the View Assigned Candidate Profile™ interface 421 utilizing a portion of the database, and FIGS. 22A–B, 23A–C, 24, 25A–B, 26A–B, and 27, exemplary displays of an Assigned Candidate Profile™ interface. The Assigned Candidate Profile™ interface presents to a client the selection of candidates that meet the client's request for an employee or other personnel. Preferably, the client contact can drill down to details concerning the candidate profiles that are of interest. The client can view a selection of Assigned Candidate Profile™, thereby viewing a dossier of selected candidates, preferably including most or all of the data collected on the employees or other personnel.

Part of the Assigned Candidate Profile™ is a summary of reference comments, interview impressions, highlights of the candidate's experience relating to the assignment, and past performance feedback. This report will be submitted to clients once the client has requested personnel and/or temporary staffing.

In alternative preferred embodiments, the candidate profile advantageously includes a video clip interview. Such video clip interview will be sufficiently long to provide an impression of the candidate, for example, three or four minutes long. The video clip includes, for example, responses to a set of standard questions, and/or free format questions. Further, the video clip could be provided in two tiers. The first tier would include principally the standard questions asked of all candidates; the second tier could include firm-specific standard questions specific to a particular client interested in the additional personnel. The second tier would optionally necessitate a second interview for those candidates.

In alternative preferred embodiments, the video clips are real time streaming or quick time streaming. For example, there are major practical advantages to using QuickTime™, which allows the system to protect the candidates with respect to privacy/security.

The candidate profile also preferably includes the candidate's resume. The system captures the resume initially, at the time a prospective employee or worker becomes an employee, temporary staff or other personnel. As described below, the prospective employee/personnel may be requested to fill out the online application, experience evaluation form, and perhaps do the test materials. This information can be optionally provided as part of the detail in the assigned candidates profiles.

The candidate profiles, the reference comments, interview comments highlight the candidate's experience again referring back to the experience evaluation form, any past performance feedback (from the SCORE™ client feedback reports, reviews from a prior client, the SCORE™ results from prior assignments) are part of the detail provided. This shows not only the employee's experience prior to working as a temp or other personnel, but also their experience and evaluations as a temp/personnel.

The system advantageously displays any disclaimer language, such as EEOC language, in the Assigned Candidate Profile™.

Once the request for a candidate is filled, i.e., a candidate is selected by the client, preferably an assignment confirmation letter is transmitted, electronically or otherwise. Advantageously, the system also disburses an e-mail message to the employee confirming the assignment, describing the client, described client location, detailing access for that client, and listing any special client requests or instructions.

With respect to the Assigned Candidate Profiles™, the system optionally provides some information that comes from the employee interview. Preferably, there is the scale or evaluation that quantifies more of the intangible aspects of a candidate that is completed by the interviewer at the employee interview. An evaluation based on an employee's skills and experience is different from an evaluation on how an employee will fit the personality of a law firm. This report quantifies the softer part of the interview process, so the clients know who would fit a particular job or environment better than another candidate. Thus, the Assigned Candidate Profile™s supply some of this information. In preferred embodiments, the system also references the reference check reports, preferably a digitized facsimile of, or other data providing, the reference check.

FIGS. 22A–B show a portfolio of candidates, including a list of names of the candidates. Detailed information on each candidate can be viewed. For example, FIGS. 23A–C show a summary of SCOREs and experience for one selected candidate. Further details can be shown for summarized aspects. For example, FIG. 24 shows details of the interview, e.g., the soft portion of candidate evaluation; FIGS. 25A–B show details of references received; FIGS. 26A–B show details of experience; and FIGS. 27A–C show details of SCORE™S received by the employee in prior projects.

Of course, the details of user interfaces for displaying information regarding employees could be different. The point is that the client has access to as much employee information as possible that is stored by the system and that will be of interest to the client. Naturally, the extent of employee information shown may be limited by regulation; for example, personal information might not be provided particularly to merely potential employers.

Budget and Planning Report

This report is intended to be provided to clients. This report will initially utilize historical data for a similar project, preferably for the same client. Certain information that is part of the historical data will be variable, and may be altered by the client/user. For example, variables could include total project cost, time, staffing, billing, and pay rates. The information utilized is similar to that utilized in the CaseManager™. The use of variables allows for projection off of historical data.

Cost Savings Analysis

This report is intended to be provided to clients. Utilizing a historical project, the system compares the actual results for the case or project to be staffed with predicted results utilizing in-house staff, for example. Each in-house staff person typically has a cost assigned to him/her. By utilizing the client's in-house numbers in the project, compared to the actual numbers in the project, an estimate can be made of the cost savings to the client. This report is similar to the CaseManager™ report in relation to the data which is utilized, however, this report compares historical data with in-house cost structures.

Project Completion Survey

This survey is provided to clients. At the completion of a particular project, the system preferably transmits a questionnaire on how the project was staffed and overall client satisfaction. In alternative preferred embodiments, the questionnaire is transmitted to the client upon completion of a project for each client. Preferably, the questionnaire requests that the client provide both quantitative and qualitative information concerning the project.

Online Timesheets

Figure 10:
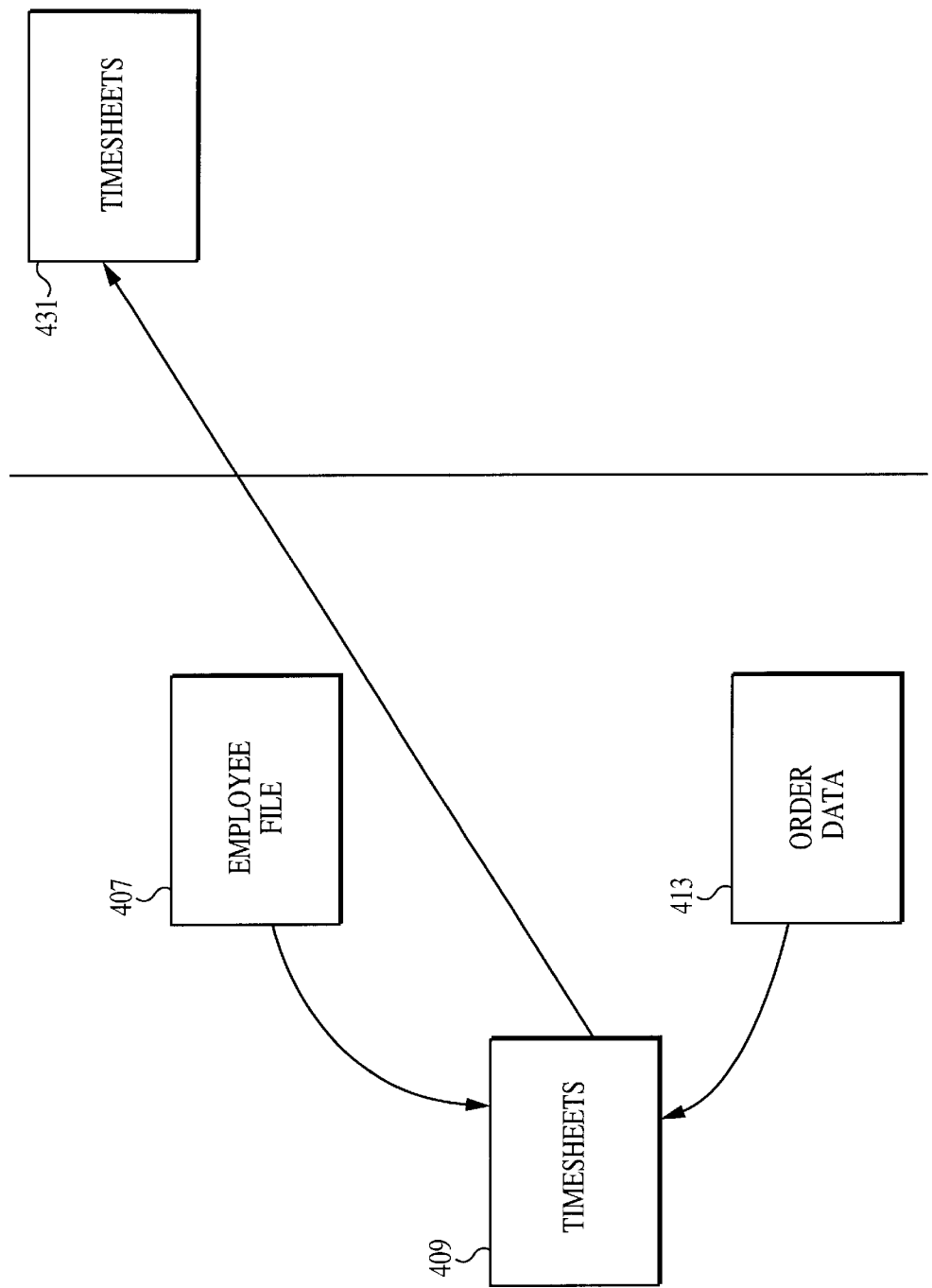
FIG. 10 is a data flow diagram illustrating the database and timesheets employee user interface.

Online timesheets are illustrated in FIG. 10, and are provided to employees. As outlined herein, timesheet data is collected by the system, and is preferably stored in the timesheet table 409. In alternative preferred embodiments, each timesheet may be submitted or entered electronically by each employee. Further, the timesheet for an employee is submitted for approval to the client corresponding to the timesheet. The approval is preferably obtained prior to entering the timesheet data into the timesheet table. The timesheets are correlated to the employee file 407 and order data 413.

Prospective Employee Report

Figure 12:
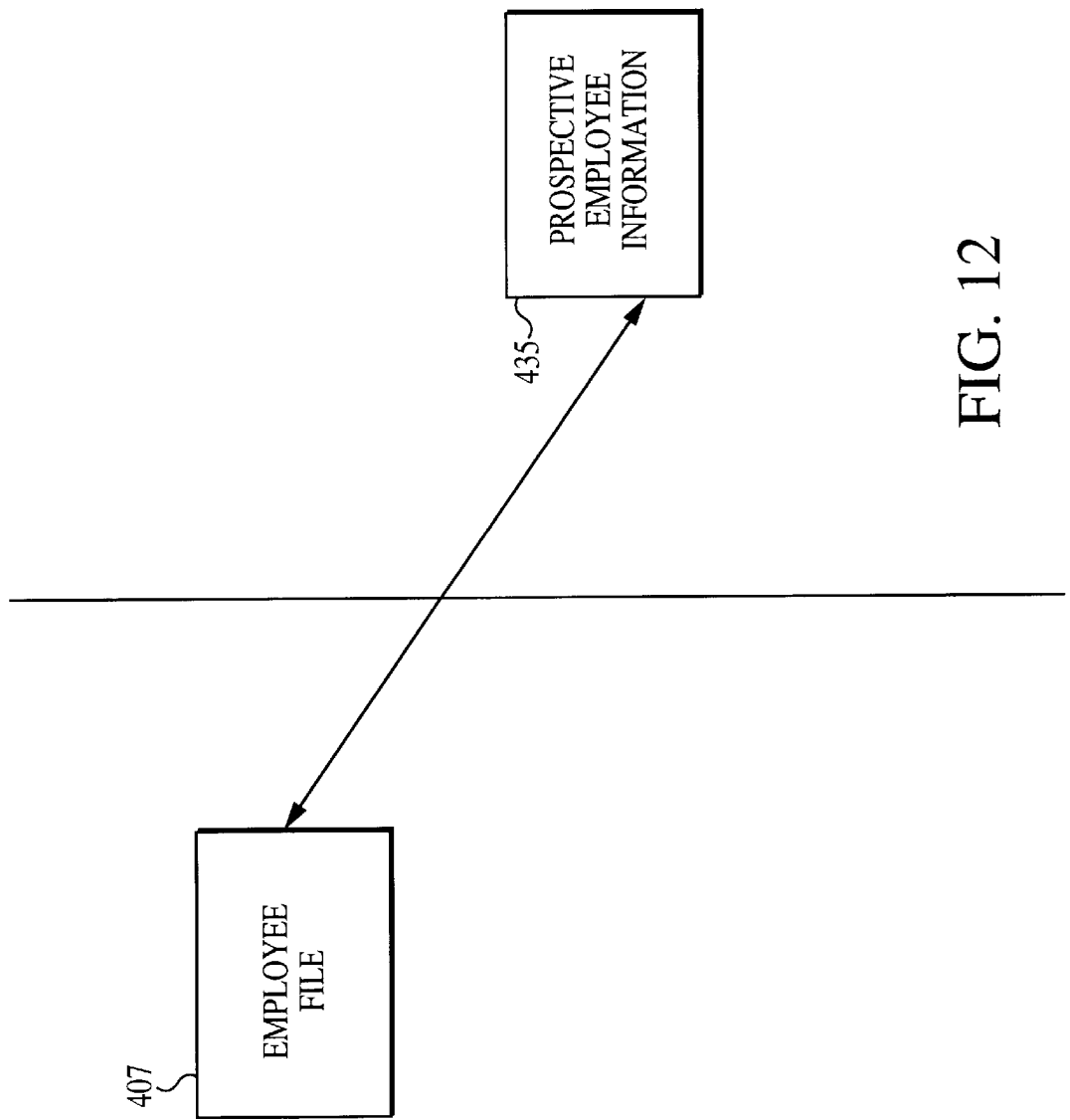
FIG. 12 is a data flow diagram illustrating the database and Prospective Employee Information employee user interface.

Reference is made to FIG. 12, showing the prospective employee information report 435. This report is intended to be provided to prospective employees, staff or personnel, that is, persons that wish to become part of the system. In alternative preferred embodiments, these persons wish to be employed by the temporary staffing agency; such persons are referred to as "potential employees". In highly preferred embodiments, the system provides online information to be completed by the potential employee. Such information includes the usual information desired of applicants, including the application form and preliminary paperwork. The type of information that is to be requested may be customized according to the employer's preferences. The collected information is stored in the employee file 407, preferably after the prospective employee is approved to be an employee.

Preliminary papers could include an application. The application is comprehensive, and requests the employee to input information on, e.g., his/her degree(s), bar membership(s), language fluency, schools attended, etc. This information is used to populate the employee file 407.

Another optional aspect of the present invention is the experience evaluation form. FIG. 28 is an example experience evaluation form. Other input could include a form which the employee fills out which then provides their experience in very detailed, broken down area of legal experience, including the months of experience, as well as the last time they actually performed these kinds of services.

According to preferred embodiments, the employee is permitted to update this information. Preferably the system provides an audit trail for updated information, and provides a method for an update request to be independently verified before the database is updated.

View Current Assignment

Figure 11:
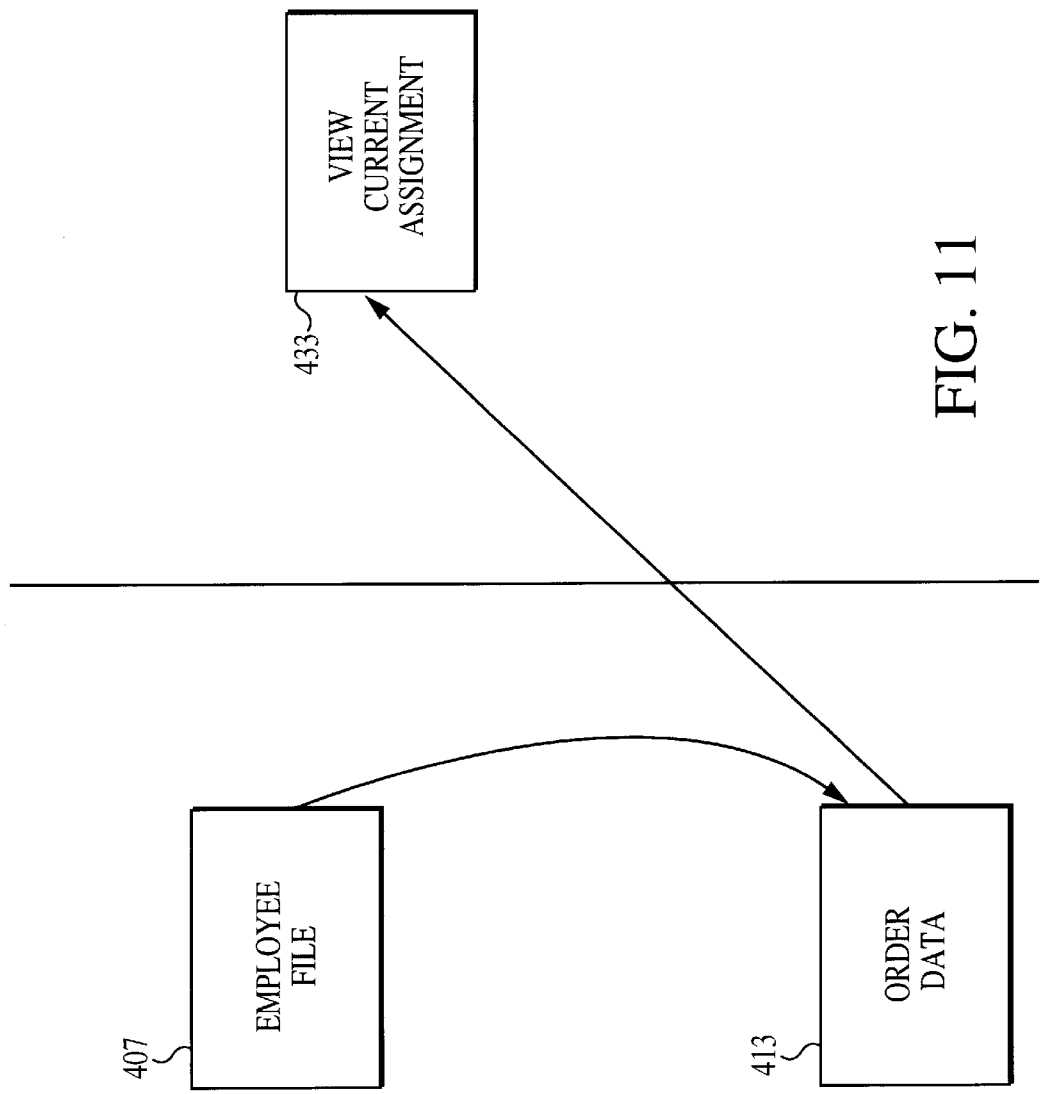
FIG. 11 is a data flow diagram illustrating the database and View Current Assignments employee user interface.

Reference is made to FIG. 11. The View Current Assignment report 433 is intended to be provided to employees. In alternative preferred embodiments, the employee may electronically request a report verifying the current assignment. This report would include information on the current assignment corresponding to the employee. Data is utilized from the order data file 413 and the employee file 407.

Automatic Updates

This interface is intended to be provided to employees or personnel. In an alternative embodiment of the invention, the system advantageously and periodically transmits, to each employee, a request for updated employee information. Information for employees, such as contact information and availability for example, changes occasionally; if the employee is not prompted to update the information, it is typically not updated. If the employee provides new information, the stored data is updated. The request for automatic update, transmitted preferably once a month, will tend to keep the employee information current.

If the system has not heard from an employee within a certain time period, such as a month, it automatically sends an e-mail to the employee asking them to log into the web page to confirm whether they are available or not. Then, the system provides a very current database of employees in our pool that are known to be available to work. Other standard means may be used to proactively have the employee update their information, or have the employee contact the system for updating their information.

Automatic Transmission of Resources

In alternative preferred embodiments of the invention, the system transmits, at predetermined points in time or at periodic intervals, to employees, clients and contacts, certain information resources. The information resources that are to be sent are intended to be timely, and are intended to include information drawn from the database. The information resources could also be sent on demand, if desired.

Examples of information resources that could be automatically sent include:

Assignments—information on new or current assignments, such as assignment address, time, subject matter, contacts, is collected and transmitted to the employee;

Tips—information intended to increase the success of the assignment, such as tips on temping, is collected and transmitted to the employee; the collected information may be, by way of example, general, specific to the firm corresponding to the employee's assignment, specific to the employee, or specific to the substantive area of the employee's assignment, and other resources that employees can use to help them do their job better;

Client information—information specific to the client corresponding to the employee's assignment is transmitted to the employee;

Time Sheet Report—historical information on time sheets is collected and transmitted to the employee.

Employee History

Figure 13:
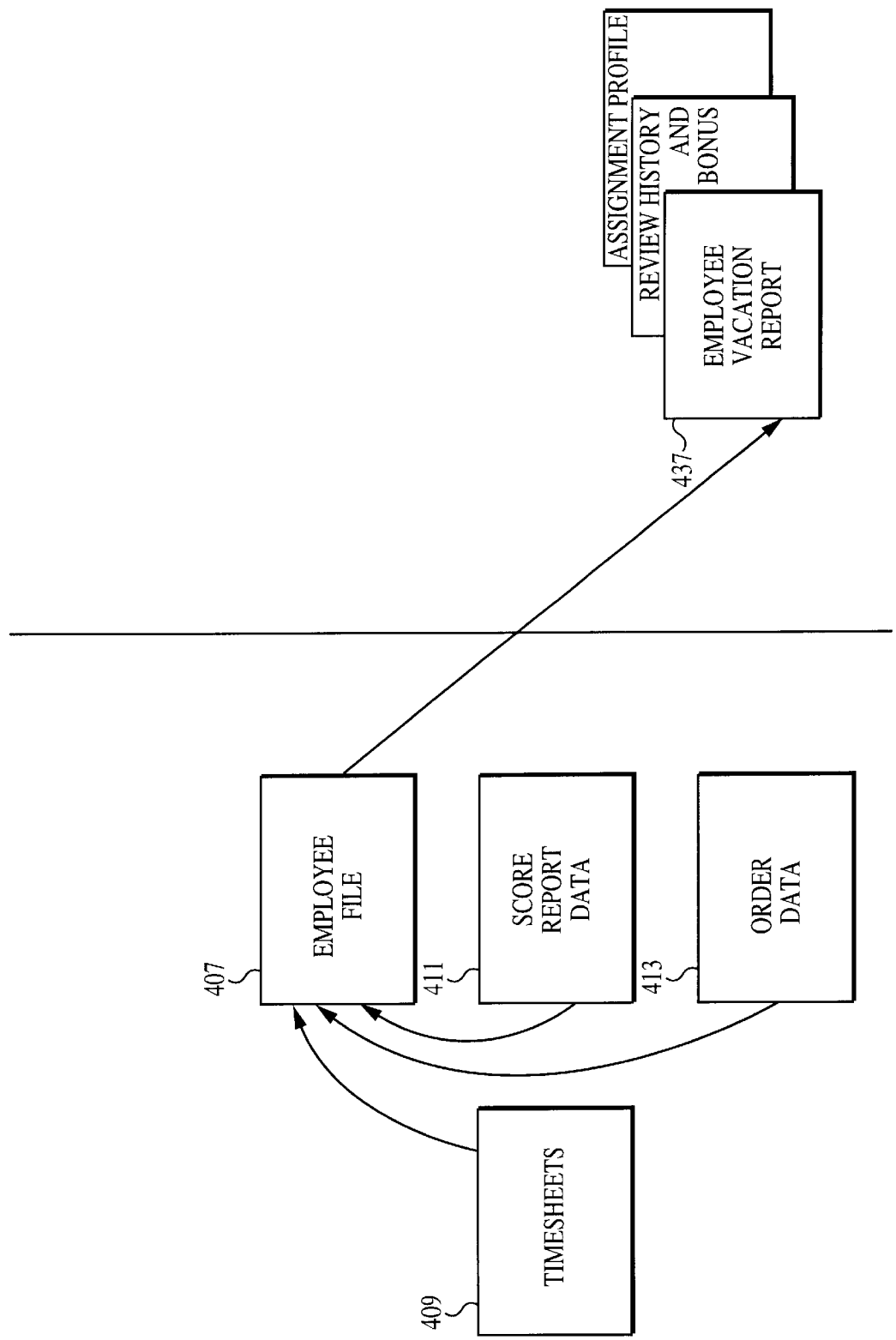
FIG. 13 is a data flow diagram illustrating the database and Employee History employee user interface.
Figure 29:
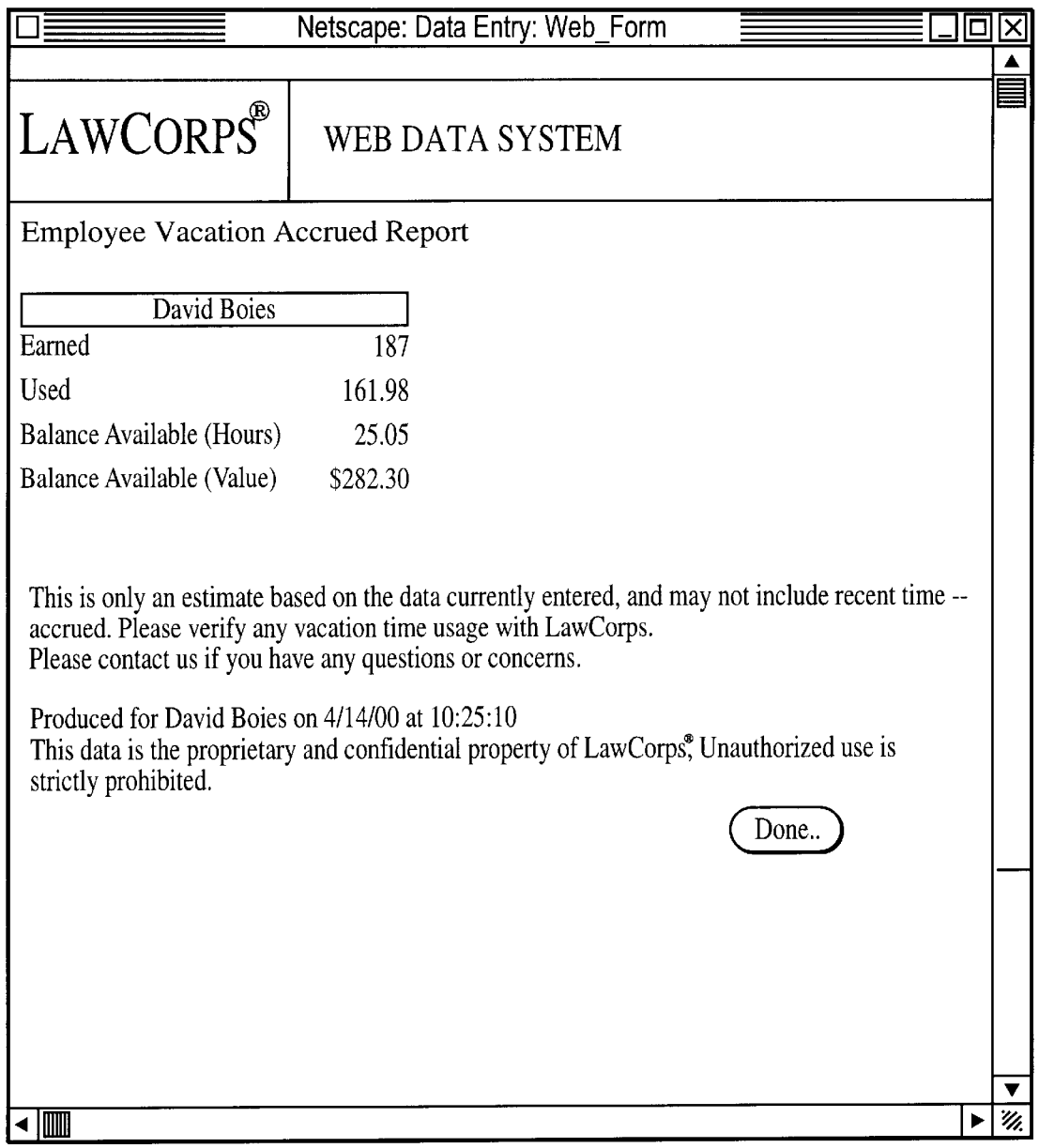
FIG. 29 is an exemplary employee vacation report.
Figure 32A:
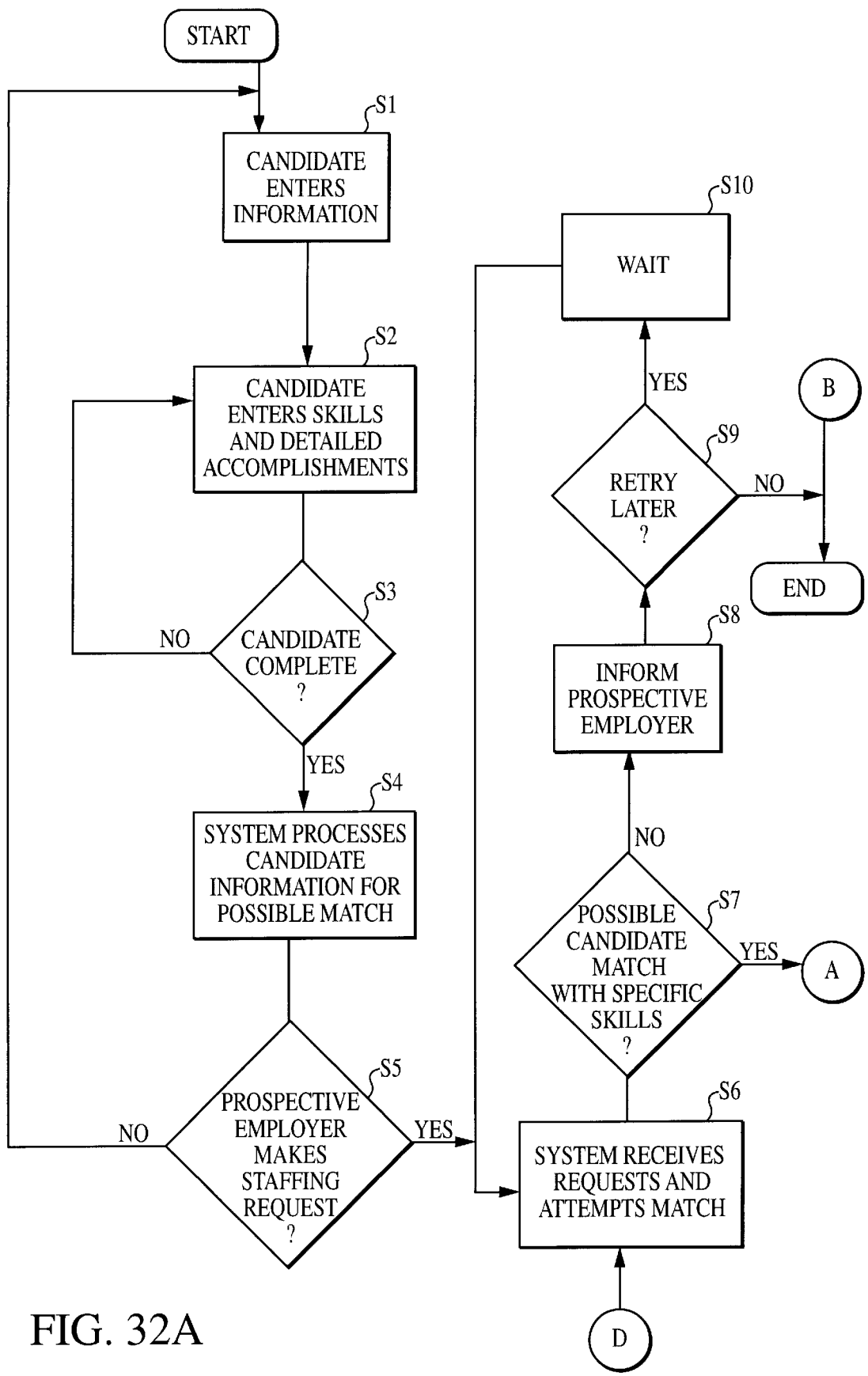
FIGS. 32A–C are a flow chart illustrating one or more embodiments of the present invention.
Figure 32B:
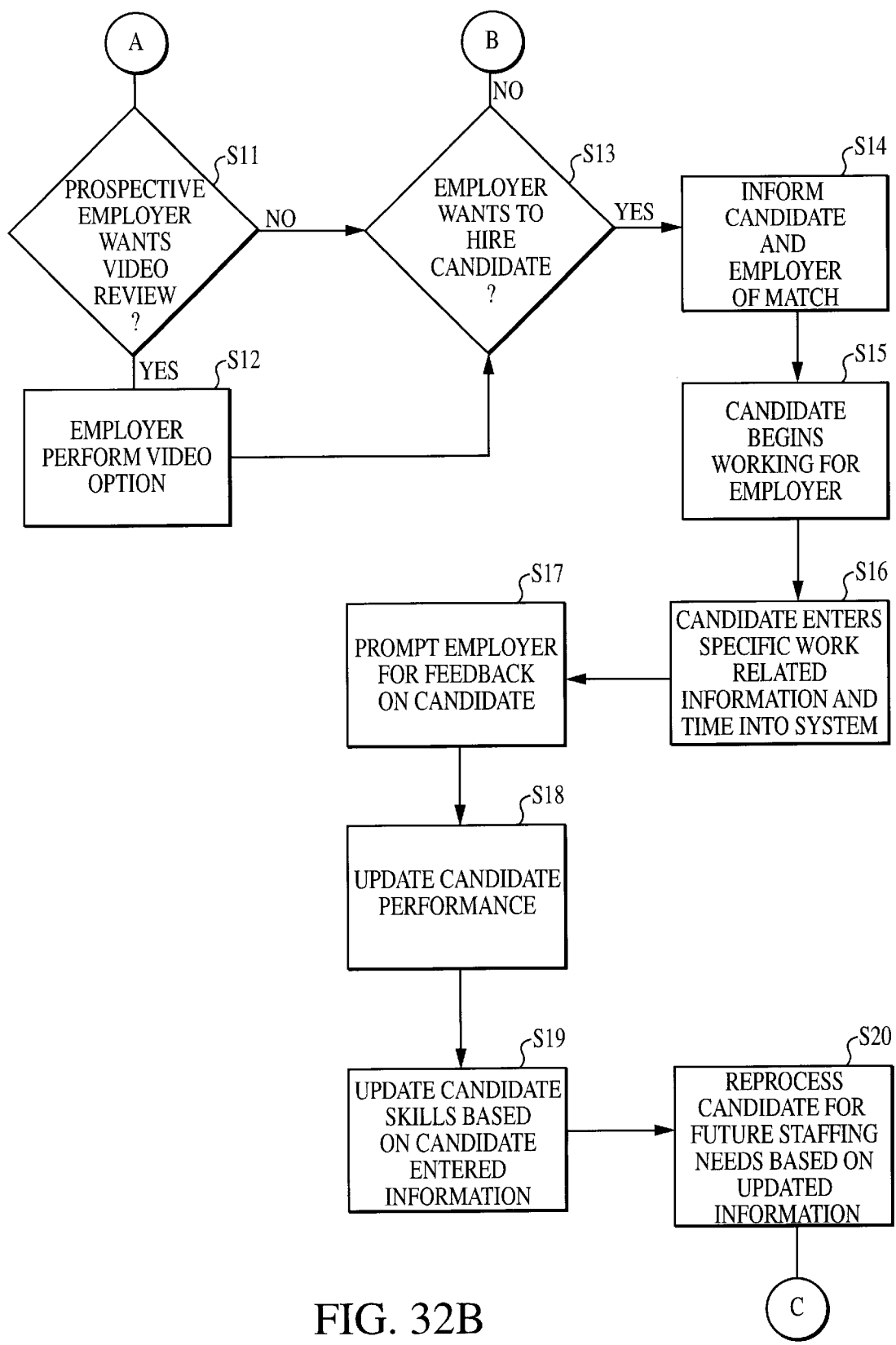
Figure 32C:
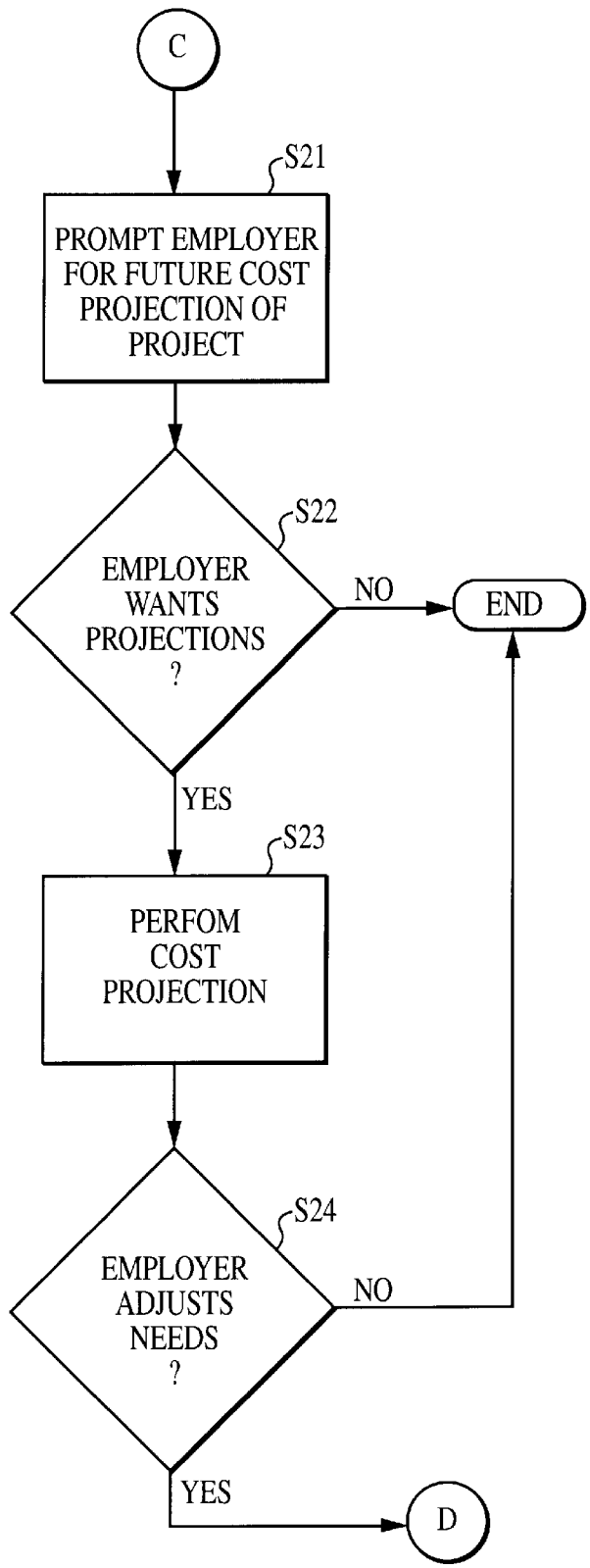

As illustrated in FIGS. 13, 29 and 30, the system provides an interface for employees to check their personal statistics and history. Such statistics include available vacation time, review history and bonus. This report is on the employee side, and it should provide the employee a summary of their entire working history as a temporary employee.

The months in which the employee was not working as a temp and/or personnel are not detailed. The present invention provides a complete look at the employee's financial picture with the employer, which is very helpful to people who in particular have questions about tax implications or have questions about how much time they worked in a prior month. The employee can go online and verify it themselves against their own time sheets.

Potential bonus is also listed, which is dependent on the SCORE™ client feedback review from the client. Other financial employee information may be included, such as for example a profit sharing account, taxes, pension programs, etc. The system optionally displays the pay rate.

As an additional feature, the system optionally displays, for example, the top ten billing temps for the week.

At the end of the month, there could be another bonus for whoever worked the hardest, or temps that received the best satisfaction rating from the corresponding clients.

The system utilizes information stored in the employee file 407, the SCORE™ report data file 411, the order data file 413, and the timesheets file 409 to provide the employee history.

Specifics have been provided above, but it will be appreciated by those of skill in the art that substitutions may be made. For example, there are a number of appropriate alternatives for structuring a database. Also, the detailed description lists various data that is collected; in alternative embodiments other selections of similar information may be collected; information may be omitted or additional information included and still remain within the scope of the invention. Further, although specific user interfaces have been described, these were given by way of example; other appropriate user interfaces may be utilized.

The invention is described in detail in connection with a legal temporary staffing scenario. Nevertheless, the invention is also useful for non-legal temporary staffing. Further, it is envisioned that the invention may be utilized in a non-temporary staffing scenario, such as in-house, particularly where the legal staff has a separate organizational identity.

While the preferred mode and best mode for carrying out the invention have been described, those familiar with the art to which this invention relates will appreciate that various alternative designs and embodiments for practicing the invention are possible, and will fall within the scope of the following claims.

What is claimed is:

1. A computer-implemented method for a computer-assisted staffing of employees for a client, comprising the steps of:

(a) storing, in an employee data storage in a computer system, employee data for at least one employee;

(b) storing, in a firm data storage in the computer system, firm data for at least one client;

(c) storing, for the at least one client, in an order data storage in the computer system, order data;

(d) responsive to an order data from the client, searching at least a portion of the database for at least one employee substantially corresponding to the order data; retrieving the located at least one employee into at least one candidate profile; and at least one of automatically and responsive to at least one of manual and semi-manual selection by the client of the at least one employee, assigning the at least one employee in the at least one candidate profile to the client;

(e) storing, for the at least one employee, in a timesheet storage in the computer system, a plurality of timesheets corresponding to the at least one client; and (f) storing, in a feedback storage in the computer system, feedback from the client corresponding to the employee, to be used in additional searching for the at least one employee with other employee data for the at least one client or other clients.

2. The method as claimed in claim 1, wherein said at least one client comprises a plurality of clients.

3. The method as claimed in claim 1, wherein said at least one employee comprises a plurality of employees.

4. The method as claimed in claim 1, wherein said at least one client comprises a plurality of clients and said at least one employee comprises a plurality of employees.

5. The method as claimed in claim 1, wherein the data storages include a relational database.

6. The method as claimed in claim 1, wherein at least one of the steps of storing is responsive to a user request over a communications network.

7. The method as claimed in claim 1, wherein the step of storing employee data includes:

(a) receiving a resume for the at least one employee;

(b) storing quantitative data for the at least one employee; and (c) storing qualitative data for the at least one employee.

8. The method as claimed in claim 1, wherein the step of storing firm data includes:

(a) receiving information on quantitative preferences for the client, and (b) storing information on contacts for the client.

9. The method as claimed in claim 1, wherein the step of storing order data includes:

(a) receiving, responsive to a request from a client, quantitative preferences for an employee; and (b) receiving a quantitative description of the project to which the employee is to be assigned.

10. The method as claimed in claim 1, wherein the step of providing at least one candidate profile includes displaying, responsive to an inquiry from the client, the at least one candidate profile for the at least one employee.

11. The method as claimed in claim 1, wherein the step of storing timesheets is responsive to an entry of at least one timesheet from the at least one employee.

12. The method as claimed in claim 1, wherein the step of storing feedback includes, responsive to a request from the at least one client, inputting feedback information.

13. The method as claimed in claim 1, wherein the step of storing feedback includes displaying, to the at least one client, at least one empty feedback for the at least one employee corresponding to the at least one client.

14. The method as claimed in claim 1, further comprising the step of, responsive to a request from the at least one client, locating and providing historical case data to the at least one client indicating financial history, including at least one of total cost, average cost, average bill rate, cost per project, cost per client contact, breakdown by project, and breakdown by case reference number.

15. The method as claimed in claim 1, further comprising the step of, responsive to a request from the at least one client, locating and providing historical personnel data to the at least one client indicating personnel data, including at least one of: employees working for the at least one client, work performed by said employees, dates worked by said employees, total hours worked by said employees, and feedback received for said employees.

16. The method as claimed in claim 1, further comprising the step of, responsive to a futures request from the client:

(a) Selecting at least one project corresponding to the at least one client;

(b) inputting variables from the at least one client, and utilizing the variables in the at least one project in calculating a futures report including at least a future time period; and (c) providing the futures report to the at least one client.

17. A computer-implemented method for a computer-assisted staffing of employees for a client, comprising the steps of:

(a) collecting and storing, in an employee data storage in a computer system, employee data for at least one employee;

(b) collecting and storing, in a firm data storage in the computer system, firm data for at least one client;

(c) collecting and storing, for the at least one client, in an order data storage in the computer system, order data;

(d) responsive to an order data from the client, searching at least a portion of the database for at least one employee substantially corresponding to the order data: retrieving the located at least one employee into at least one candidate profile; and at least one of automatically and responsive to at least one of manual and semi-manual selection by the client of the at least one employee, assigning the at least one employee in the at least one candidate profile to the client;

(e) collecting and storing, for the at least one employee, in a timesheet storage in the computer system, a plurality of timesheets corresponding to the at least one client; and (f) collecting, for the at least one client and for the at least one employee, and storing, in a feedback storage in a computer system, feedback from the client corresponding to the employee, to be used in additional searching for the at least one employee with other employee data for the at least one client or other clients;

(g) wherein there are provided a plurality of clients and a plurality of employees;

(h) wherein the data storages include a relational database;

(i) wherein at least one of the steps of collecting is responsive to a user request over a communications network;

(j) wherein the step of collecting and storing employee data includes:

(1) inputting a resume for the employee;

(2) storing quantitative data for the employee; and (3) storing qualitative data for the employee;

(k) wherein the step of collecting and storing firm data includes:

(1) inputting information on quantitative preferences for the client, and (2) storing information on contacts for the client;

(l) wherein the step of collecting and storing order data includes:

(1) inputting, responsive to a request from a client, quantitative preferences for an employee; and (2) inputting a quantitative description of the project to which the employee is to be assigned;

(m) wherein the step of assigning includes, responsive to receipt of an order data from the client, searching for at least one employee corresponding to the order data, and assigning the located employee to the client;

(n) wherein the step of collecting and storing timesheets is responsive to an entry of at least one timesheet from an employee;

(o) wherein the step of collecting feedback includes, responsive to a request from the client, inputting feedback information;

(p) wherein the step of collecting feedback includes displaying, to the client, at least one empty feedback for at least one employee corresponding to the client;

(q) responsive to a first request from the client, locating and providing historical case data to the client, including at least one of total cost, average cost, average bill rate, cost per project, cost per client contact, breakdown by project, and breakdown by case reference number;

(r) responsive to a second request from the client, locating and providing historical personnel data to the client, including at least one of total cost, average cost, average bill rate, cost per project, cost per client contact, breakdown by project, and breakdown by case reference number; and (s) responsive to a futures request from the client:
  (1) Selecting at least one project corresponding to the client;
  (2) inputting variables from the client, and utilizing those variables in the selected project in calculating a futures report including at least a future time period; and
  (3) providing the futures report to the client.

18. A system for a computer-assisted staffing of employees for client, at least one of the employees assigned to at least one client, comprising:

(a) an employee data storage in a computer system, for storing employee data for the at least one employee;

(b) a firm data storage in the computer system, for storing firm data for the at least one client;

(c) an order data storage in the computer system, storing order data for the at least one client;

(d) a timesheet storage in the computer system, for storing a plurality of timesheets of the employee corresponding to the at least one client;

(e) a search, to provide at least one candidate profile characterizing the at least one employee, responsive to an order data from the at least one client, and an assignment of the at least one employee responsive to a substantial match to the order data; and (f) a feedback storage, for storing feedback from the client corresponding to the employee, to be used in additional searching for the at least one employee with other employee data for the at least one client or other clients.

19. The system as claimed in claim 18, wherein there are provided a plurality of clients.

20. The system as claimed in claim 18, wherein there are provided a plurality of employees.

21. The system as claimed in claim 18, wherein there are provided a plurality of clients and a plurality of employees.

22. The system as claimed in claim 18, wherein the data storages include a relational database.

23. The system as claimed in claim 18, wherein information is stored responsive to a user request over a communications network.

24. The system as claimed in claim 18, wherein the stored employee data includes:
  (a) a stored resume for the employee;
  (b) stored quantitative data for the employee; and
  (c) stored qualitative data for the employee.

25. The system as claimed in claim 18, wherein the stored firm data includes:
  (a) stored information on quantitative preferences for the client, and
  (b) stored information on contacts for the client.

26. The system as claimed in claim 18, wherein the stored order data includes:
  (a) responsive to a request from a client, stored quantitative preferences for an employee; and (b) a stored quantitative description of the project to which the employee is to be assigned.

27. The system as claimed in claim 18, wherein the search includes:
  (a) a search of at least a portion of the database for at least one employee approximately corresponding to the order data; and
  (b) storage, corresponding to the client, of the at least one candidate profile for the located at least one employee.

28. The system as claimed in claim 18, wherein assigning includes, responsive to receipt of an order data from the client, a search for at least one employee corresponding to the order data, and an assignment of the located employee to the client.

29. The system as claimed in claim 27, wherein the at least one candidate profile includes a display, responsive to an inquiry from the client, of information representative of the at least one employee.

30. The system as claimed in claim 18, wherein the timesheets are stored responsive to an entry of at least one timesheet from an employee.

31. The system as claimed in claim 18, wherein the feedback is stored, responsive to a request from the client, inputting feedback information.

32. The system as claimed in claim 18, wherein the feedback includes a display, to the client, of at least one empty feedback for at least one employee corresponding to the client.

33. The system as claimed in claim 18, further comprising, responsive to a request from the client, a search for historical case data, and a display of the historical case data to the client, including at least one of total cost, average cost, average bill rate, cost per project, cost per client contact, breakdown by project, and breakdown by case reference number.

34. The system as claimed in claim 18, further comprising, responsive to a request from the client, a search for historical personnel data, and a display of the historical personnel data to the client, including at least one of: employees working for the at least one client, work performed by said employees, dates worked by said employees, total hours worked by said employees, and feedback received for said employees.

35. The system as claimed in claim 18, further comprising, responsive to a futures request from the client:
  (a) a search for at least one project corresponding to the client;
  (b) input variables from the client, wherein those variables are utilized in the located project in a calculation of a futures report including at least a future time period; and
  (c) a display of the futures report to the client.

36. A system for a computer-assisted staffing of employees for a client, comprising:
  (a) storage, in an employee data storage in a computer system, employee data for at least one employee;
  (b) storage, in a firm data storage in the computer system, firm data for at least one client;
  (c) storage, for the at least one client, in an order data storage in the computer system, order data;
  (d) at least one employee assigned to the at least one client;
  (e) storage, for the at least one employee, in a timesheet storage in the computer system, of a plurality of timesheets corresponding to the at least one client;

(f) for the at least one client and for the at least one employee, storage, in a feedback storage in the computer system, of feedback from the client corresponding to the employee;

(g) wherein there are provided a plurality of clients and a plurality of employees;

(h) wherein the data storages include a relational database;

(i) wherein at least one storage is responsive to a user request over a communications network;

(j) wherein the storage of employee data includes:
   (1) a stored resume for the employee;
   (2) stored quantitative data for the employee; and
   (3) stored qualitative data for the employee;

(k) wherein the stored firm data includes:
   (1) inputted information on quantitative preferences for the client, and
   (2) stored information on contacts for the client;

(l) wherein the stored order data includes:
   (1) inputted quantitative preferences for an employee; and
   (2) inputted quantitative description of the project to which the employee is to be assigned;

(m) wherein assigning includes, responsive to receipt of an order data from the client, a search for at least one employee substantially corresponding to the order data, and an assignment of the located employee to the client;

(n) wherein the stored timesheets are stored responsive to an entry of at least one timesheet from an employee;

(o) wherein the stored feedback includes, responsive to a request from the client, inputted feedback information;

(p) wherein the stored feedback includes a display, to the client, of at least one empty feedback for at least one employee corresponding to the client;

(q) responsive to a first request from the client, a search for historical case data for the client and a display of the historical case data, including at least one of total cost, average cost, average bill rate, cost per project, cost per client contact, breakdown by project, and breakdown by case reference number;

(r) responsive to a second request from the client, a search for historical personnel data for the client and a display of the historical personnel data to the client, including at least one of: employees working for the at least one client, work performed by said employees, dates worked by said employees, total hours worked by said employees, and feedback received for said employees; and (s) responsive to a futures request from the client:
   (1) a search for at least one project corresponding to the client;
   (2) inputted variables from the client, and wherein those variables are utilized in the selected project in a calculation of a futures report including at least a future time period; and
   (3) a display of the futures report to the client.

37. A system for a computer-assisted staffing of employees for a client, comprising:

(a) means for collecting and storing, in an employee data storage in a computer system, employee data for at least one employee;

(b) means for collecting and storing, in a firm data storage in the computer system, firm data for at least one client;

(c) means for collecting and storing, for the at least one client, in an order data storage in the computer system, order data;

(d) means for, responsive to an order data from the client, searching at least a portion of the database for at least one employee substantially corresponding to the order data; retrieving the located at least one employee into at least one candidate profile; and at least one of automatically and responsive to at least one of manual and semi-manual selection by the client of the at least one employee, assigning at least one employee in the at least one candidate profile to the client;

(e) means for collecting and storing, for the at least one employee, in a timesheet storage in the computer system, a plurality of timesheets corresponding to the at least one client; and (f) means for collecting, for the at least one client and for the at least one employee, and storing, in a feedback storage, feedback from the client corresponding to the employee.

38. The system as claimed in claim 37, wherein there are provided a plurality of clients.

39. The system as claimed in claim 37, wherein there are provided a plurality of employees.

40. The system as claimed in claim 37, wherein there are provided a plurality of clients and a plurality of employees.

41. The system as claimed in claim 37, wherein the data storages include a relational database.

42. The system as claimed in claim 37, wherein at least one of the means for collecting is responsive to a user request over a communications network.

43. The system as claimed in claim 39, wherein the means for collecting and storing employee data includes:
   (a) means for receiving a resume for the employee;
   (b) means for storing quantitative data for the employee; and
   (c) means for storing qualitative data for the employee.

44. The system as claimed in claim 37, wherein the means for collecting and storing firm data includes:
   (a) means for receiving information on quantitative preferences for the client, and
   (b) means for storing information on contacts for the client.

45. The system as claimed in claim 37, wherein the means for collecting and storing order data includes:
   (a) means for receiving, responsive to a request from a client, quantitative preferences for an employee; and
   (b) means for receiving a quantitative description of the project to which the employee is to he assigned.

46. The system as claimed in claim 37, wherein the means for providing at least one candidate profile includes displaying, responsive to an inquiry from the client, the candidate profile for the at least one employee.

47. The system as claimed in claim 37, wherein the means for collecting and storing timesheets is responsive to an entry of at least one timesheet from an employee.

48. The system as claimed in claim 37, wherein the means for collecting feedback includes, responsive to a request from the client, means for inputting feedback information.

49. The system as claimed in claim 37, wherein the means for collecting feedback includes displaying, to the client, at least one empty feedback for at least one employee corresponding to the client.

50. The system as claimed in claim 37, further comprising means, responsive to a request from the client, for locating and providing historical case data to the client, including at least one of total cost, average cost, average bill rate, cost per project, cost per client contact, breakdown by project, and breakdown by case reference number.

51. The system as claimed in claim 37, further comprising means, responsive to a request from the client, for locating and providing historical personnel data to the client, including at least one of: employees working for the at least one client, work performed by said employees, dates worked by said employees, total hours worked by said employees, and feedback received for said employees.

52. The system as claimed in claim 37, further comprising means, responsive to a futures request from the client, for:
(a) selecting at least one project corresponding to the client;
(b) inputting variables from the client, and utilizing those variables in the selected project in calculating a futures report including at least a future time period; and
(c) providing the futures report to the client.

53. A system for a computer-assisted staffing of employees for a client, comprising:
(a) means for collecting and storing, in an employee data storage in a computer system, employee data for at least one employee;
(b) means for collecting and storing, in a firm data storage in the computer system, firm data for at least one client;
(c) means for collecting and storing, for the at least one client, in an order data storage in the computer system, order data;
(d) means for, responsive to an order data from the client, searching at least a portion of the database for at least one employee substantially corresponding to the order data; retrieving the located at least one employee into at least one candidate profile; and at least one of automatically and responsive to at least one of manual and semi-manual selection by the client of the at least one employee, assigning at least one employee in the at least one candidate profile to the client;
(e) means for collecting and storing, for the at least one employee, in a timesheet storage in the computer system, a plurality of timesheets corresponding to the at least one client; and
(f) means for collecting, for the at least one client and for the at least one employee, and storing, in a feedback storage in the computer system, feedback from the client corresponding to the employee;
(g) wherein there are provided a plurality of clients and a plurality of employees;
(h) wherein the data storages include a relational database;
(i) wherein at least one of the means for collecting is responsive to a user request over a communications network;
(j) wherein the means for collecting and storing employee data includes:
 (1) means for receiving a resume for the employee;
 (2) means for storing quantitative data for the employee; and
 (3) means for storing qualitative data for the employee;
(k) wherein the means for collecting and storing firm data includes:
 (1) means for receiving information on quantitative preferences for the client; and
 (2) means for storing information on contacts for the client;
(l) wherein the means for collecting and storing order data includes:
 (1) means for receiving, responsive to a request from a client, quantitative preferences for an employee; and
 (2) means for receiving a quantitative description of the project to which the employee is to be assigned;
(m) wherein the means for assigning includes, responsive to receipt of an order data from the client, means for searching for at least one employee corresponding to the order data, and for assigning the located employee to the client;
(n) wherein the means for collecting and storing timesheets is responsive to an entry of at least one timesheet from an employee;
(o) wherein the means for collecting feedback includes, responsive to a request from the client, means for inputting feedback information;
(p) wherein the means for collecting feedback includes displaying, to the client, at least one empty feedback for at least one employee corresponding to the client;
(q) means, responsive to a first request from the client, for locating and providing historical case data to the client, including at least one of total cost, average cost, average bill rate, cost per project, cost per client contact, breakdown by project, and breakdown by case reference number.;
(r) means, responsive to a second request from the client, for locating and providing historical personnel data to the client, including at least one of: employees working for the at least one client, work performed by said employees, dates worked by said employees, total hours worked by said employees, and feedback received for said employees; and
(s) means, responsive to a futures request from the client, for:
 (1) selecting at least one project corresponding to the client;
 (2) inputting variables from the client, and utilizing those variables in the selected project in calculating a futures report including at least a future time period; and
 (3) providing the futures report to the client.

54. A computer implemented method of staffing of at least one candidate for at least one client using a computer, comprising the steps of:
(1) inputting into the computer personnel data associated with at least one candidate, including a resume, quantitative and qualitative data for the at least one candidate;
(2) inputting into the computer client data, and personnel order data for the at least one client, including quantitative preferences for the at least one candidate, and a quantitative description of at least one project to which the at least one candidate is being hired by the at least one client;
(3) searching by the computer system for the at least one candidate that substantially matches the personnel order data requested by the at least one client, and assigning the at least one candidate to the at least one client responsive to a substantial match thereto;

(4) inputting a plurality of timesheets summarizing work activity and time associated therewith conducted on at least one project for the at least one client;

(5) receiving feedback from the at least one client corresponding to the work activity performed by the at least one candidate;

(6) updating the personnel data associated with at least one candidate, including the quantitative and the qualitative data for the at least one candidate responsive to the feedback to be used in additional searching for a substantial match of the at least one candidate with other personnel order data for the at least one client or other clients;

(7) responsive to a client monitor request from the at least one client, providing historical work activity data and the personnel data to the at least one client; and (8) responsive to a futures request from the at least one client, providing a project cost estimate for additional work activities to be performed by the at least one candidate.

55. The method of claim 54, the historical work activity data including at least one of total cost, average cost, average bill rate, cost per project, cost per client contact, breakdown by project, and breakdown by case reference number; and the personnel data including at least one of: employees working for the at least one client, work performed by said employees, dates worked by said employees, total hours worked by said employees, and feedback received for said employees.

56. The method of claim 54, the project cost estimate including at least a future time period.

* * * * *